US006264454B1

(12) United States Patent
Hale

(10) Patent No.: US 6,264,454 B1
(45) Date of Patent: Jul. 24, 2001

(54) WRAPPED SMC CHARGE METHOD AND APPARATUS

(75) Inventor: Patrick Steven Hale, Angola, IN (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/038,315

(22) Filed: Mar. 11, 1998

(51) Int. Cl.[7] .............................. B29C 45/18; B29C 45/02

(52) U.S. Cl. ........................ 425/89; 425/391; 425/544; 264/145; 264/257; 264/281; 264/285

(58) Field of Search .................... 264/328.1, 145, 264/328.4, 328.5, 328.7, 328.8, 328.9, 281, 285, 257, 258; 425/130, 89, 137, 149, 145, 549, 391; 156/193

(56) References Cited

U.S. PATENT DOCUMENTS

| | | |
|---|---|---|
| 2,710,938 | 6/1955 | Willcox et al. . |
| 2,713,697 | 7/1955 | Wilcox . |
| 3,670,066 | * 6/1972 | Valyi .................................. 264/148 |
| 3,969,461 | 7/1976 | Boesch et al. . |
| 4,141,929 | 2/1979 | Stoops et al. . |
| 4,339,490 | 7/1982 | Yoshioka et al. . |
| 4,374,795 | 2/1983 | Keilp et al. . |
| 4,386,898 | 6/1983 | Sera . |
| 4,389,358 | * 6/1983 | Hendry ................................ 264/45.1 |
| 4,407,772 | * 10/1983 | Maglio ................................. 264/294 |
| 4,436,685 | 3/1984 | Emura et al. . |
| 4,451,528 | 5/1984 | Krause . |
| 4,488,862 | 12/1984 | Epel et al. . |
| 4,569,814 | 2/1986 | Chong et al. . |
| 4,611,983 | 9/1986 | Bielfedlt . |
| 4,612,149 | 9/1986 | Iseler et al. . |
| 4,643,126 | 2/1987 | Wilkinson et al. . |
| 4,648,825 | * 3/1987 | Heil et al. ............................. 425/186 |
| 4,780,432 | 10/1988 | Minford et al. . |

(List continued on next page.)

FOREIGN PATENT DOCUMENTS

| | | |
|---|---|---|
| 3336-080 | 4/1983 | (DE) . |
| 0 177 736 | 4/1986 | (EP) . |
| 0 376 472 | 7/1990 | (EP) . |
| 0 510 414 A1 | 10/1992 | (EP) . |
| 0 548 801 A1 | 6/1993 | (EP) . |
| 955413 | 1/1950 | (FR) . |
| 2 413 201 | 7/1979 | (FR) . |
| 2 480 667 | 10/1981 | (FR) . |
| 0 396 456 | 11/1990 | (FR) . |
| 63-176115 | 7/1988 | (JP) . |
| 63-207625 | 8/1988 | (JP) . |

OTHER PUBLICATIONS

*Encyclopedia of Polymer Science and Engineering,* vol. 14, John Wiley & Sons, 1988, pp. 332–333 and 387.

*FRP An Introduction to Fiberglas–Reinforced Plastics/Composites,* Owens/Corning Fiberglas, pp. 22–23.

*McGraw–Hill Encyclopedia of Science & Technology,* 6th Edition, pp. 35–40.

Primary Examiner—Jan H. Silbaugh
Assistant Examiner—Mark Eashoo
(74) Attorney, Agent, or Firm—Harness, Dickey & Pierce, P.L.C.

(57) ABSTRACT

A transfer/injection molding apparatus and process is defined that includes a charge forming unit. The charge is formed so that the fibers therein are randomly oriented in substantially parallel horizontal planes such that they are always substantially parallel to the direction of initial flow into the cavity of the molding unit. The charge forming unit includes a cutter for cutting sheet material into strips and a wind-up fork for rolling the strips into wrapped charges. The wrapped charges are formed by winding the strips around prongs extending from the wind-up fork. Further, the fork is attached to a robotic arm which loads the wrapped charge into the molding die.

19 Claims, 21 Drawing Sheets

U.S. PATENT DOCUMENTS

| | | |
|---|---|---|
| 4,849,147 | 7/1989 | Freeman . |
| 4,867,924 | 9/1989 | Schilkey et al. . |
| 4,911,876 | 3/1990 | Freeman . |
| 5,039,465 | 8/1991 | Freeman et al. . |
| 5,057,257 | 10/1991 | Neitzke . |
| 5,061,423 | 10/1991 | Layden . |
| 5,130,071 | 7/1992 | Iseler et al. . |
| 5,202,071 * | 4/1993 | Nakamura et al. .................. 264/137 |
| 5,204,127 | 4/1993 | Prusha . |
| 5,217,656 | 6/1993 | Buckley et al. . |
| 5,273,418 | 12/1993 | Kato et al. . |
| 5,275,877 | 1/1994 | Isayev . |
| 5,286,326 | 2/1994 | Greve . |
| 5,308,236 * | 5/1994 | Wing-Fai .......................... 425/305.1 |
| 5,370,521 | 12/1994 | McDougall . |
| 5,382,148 | 1/1995 | Buckley . |
| 5,401,154 | 3/1995 | Sargent . |
| 5,424,017 | 6/1995 | Hinduja et al. . |
| 5,435,953 | 7/1995 | Osada et al. . |
| 5,507,633 | 4/1996 | Osada et al. . |
| 5,520,874 | 5/1996 | Chou et al. . |
| 5,753,164 | 5/1998 | Ritchie et al. . |
| 5,759,459 | 6/1998 | Eckardt et al. . |

\* cited by examiner

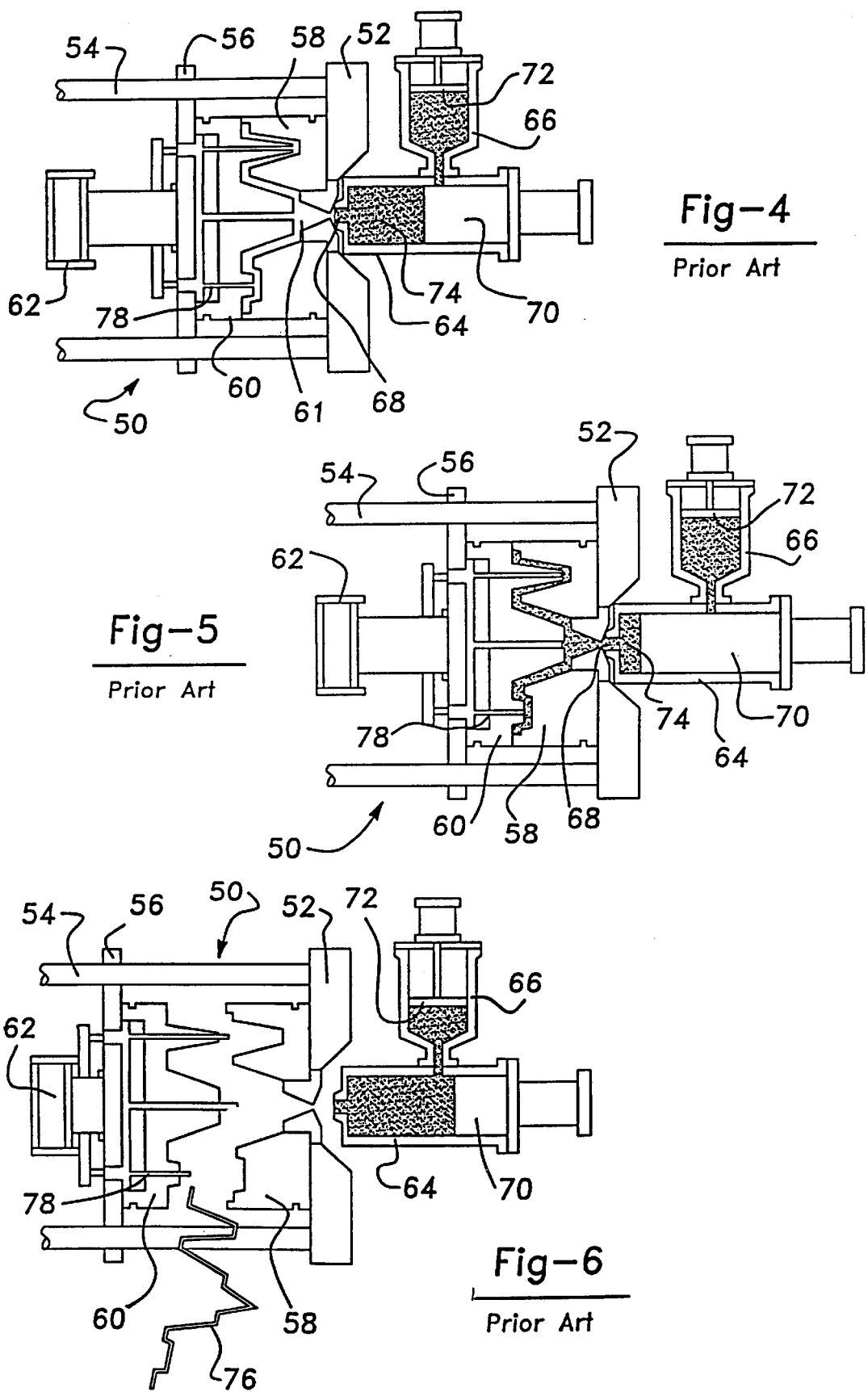

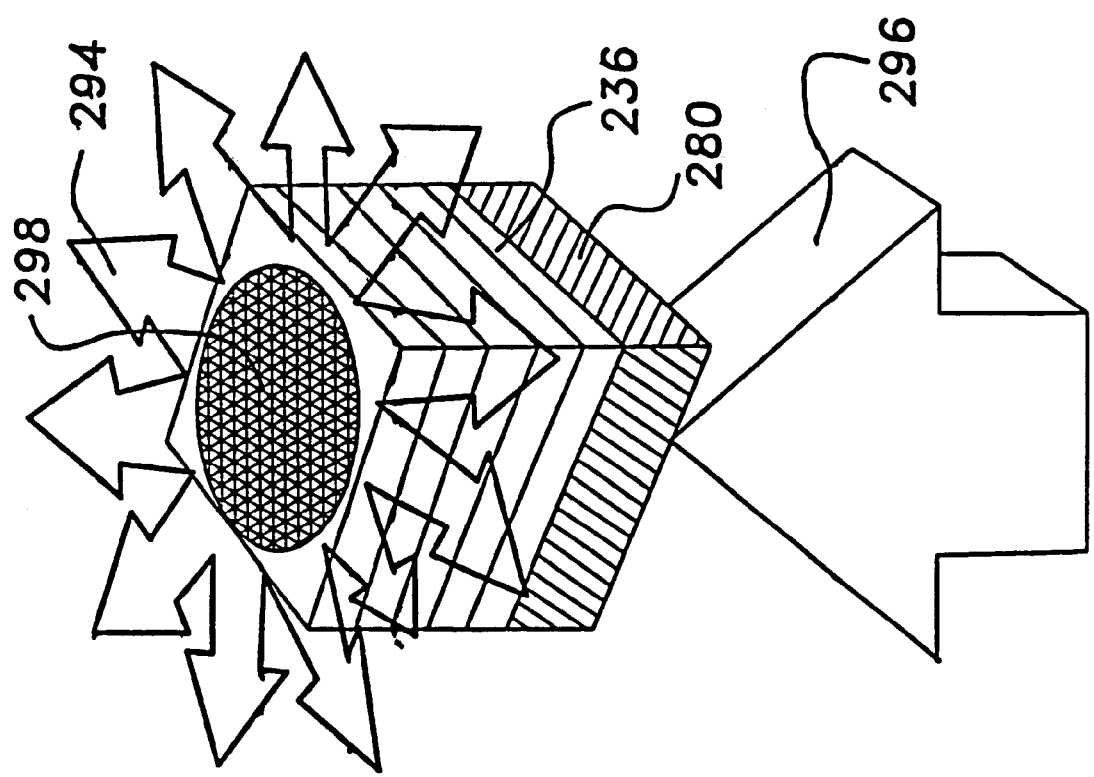

WRAPPED SMC CHARGE METHOD AND APPARATUS

BACKGROUND OF THE INVENTION

1. Technical Field

This invention relates generally to a method and an apparatus for forming SMC charges for molding processes and specifically to a method and an apparatus for forming wrapped charges from strips of SMC for use in molding fiber reinforced plastic components.

2. Discussion

Fiber reinforced plastic (FRP) parts are being increasingly considered for use in a wide variety of applications. An FRP part generally consists of a plastic shape in which carbon, glass fiber, or other reinforcing fibers are dispersed in order to provide strength to the resin.

An FRP product made from a thermosetting resin, particularly in the form of a sheet molded compound (SMC), can be formulated to have critical characteristics that are similar to the steel part it is intended to replace For example, an SMC part generally has a coefficient of thermal expansion which is equivalent to that of steel and is able to sustain an E-coat (metal protection) temperature of 400° F. Furthermore, an SMC part can be installed by mechanical fasteners or by bonding to metal in the production body shop of an original equipment manufacturer, side-by-side with an equivalent steel body part.

There are also competing thermoplastic materials which can be used instead of thermosetting resins. A number of thermoplastic materials, both reinforced and non-reinforced, have been evaluated in the automotive industry for primarily vertical components such as fenders and outer door panels. This class of materials has generally been limited to vertical panels because their stiffness is not sufficient (even in the reinforced version) for horizontal panels such as hoods and decklids.

These attempts at using thermoplastics have not been totally successful. Unlike thermosets, thermoplastics are not compatible with the automotive assembly line processes. Thermoplastics generally have to be processed separately from the E-coat bake ovens and require greater-than-desired gaps between mating surface panels to allow for their high coefficient of thermal expansion.

There are three primary processes to produce higher volume chopped fiber thermoset composite components, and there are features of each process which allow one to be the selected choice for a particular application. These three processes are compression molding, injection molding and transfer molding.

In compression molding, a charge such as a sheet molded compound containing a curable resin is placed between upper and lower heated die members defining a mold cavity. The dies are then brought to a closed position during which the dies compress the charge causing it to flow and fill the mold cavity. After the resin cures, the dies are opened and the finished part is removed. Compression molding has been historically the process of choice in making fiber reinforced thermoset composite components which require surface finish, mechanical properties and dimensional stability.

In thermoset injection molding, a plastic is injected into a cavity defined between two die halves. After cross-linking of the polymers is completed, the molds are separated and the finished part is ejected. Injection molding offers design flexibility benefits through enhanced part integration.

In transfer molding, a charge is deposited into a preheating transfer pot. A movable platform is used to drive the heated, flowable charge out of the transfer pot and through a series of channels into a plurality of mold cavities. Transfer molding is used for parts that are too small and intricate for compression molding.

Each approach of the known prior art suffers some disadvantages. Compression molding is relatively expensive. Injection molding and transfer molding cause severe degradation in mechanical properties of the resulting component because of deterioration in the integrity of the chopped fibers resulting from transportation of the material.

An additional disadvantage suffered by the prior art is the difficulty in forming and manipulating conventional stamped stack charges, as well as loading this type of charge into the molding dies. Thus, there remains the desire for an apparatus and process, which efficiently enables the molding of fiber reinforced plastic components of relatively high complexity, where the formation and manipulation of the charge used in the molding process is simple and efficient, the transfer of the prepared charge to the molding die is also efficient and the strength of the resulting component is not compromised because of fiber deterioration during the molding process.

SUMMARY OF THE INVENTION

The broad teachings of the present invention provide an improved apparatus and process for molding relatively complex fiber reinforced components at a high rate of production. The invention finds particular utility in providing an efficient and cost effective means for producing components of relatively high complexity. The present invention is advantageous over its traditional predecessors in that the formation and manipulation of the charge used in the molding process, as well as the transfer of the prepared charge to the molding die, is made simple and efficient.

Generally, the present invention incorporates a molding unit comprising upper and lower die halves with a charge overflow assembly incorporated into the lower die half. The lower die half further incorporates a hydraulically driven gate ram positioned within an apertured gateway. According to a preferred process of the present invention, a wrapped charge is prepared and automatically loaded into the apertured gateway, while the molding unit is opened and the gate ram is retracted to the depth of the pre-calculated charge height. The upper die half is lowered onto stops on the lower die half, thereby closing the molding unit and forming a mold cavity between the die halves. The gate ram then advances via a hydraulic cylinder so that the wrapped charge is pressed into the mold cavity. Excess charge pressed into the mold cavity is received by the charge overflow assembly.

According to one embodiment of the present invention, the charge overflow assembly includes an overflow pin positioned within an overflow cavity. The overflow assembly also includes a hydraulic cylinder placed behind the overflow pin for actuating movement of the overflow pin and a displacement sensing transducer attached to the hydraulic cylinder for measuring the displacement of the overflow pin caused by the excess charge from the mold cavity. According to the process of the present invention, excess charge from the mold cavity is displaced into the overflow cavity, thereby overcoming the oppositely directed force exerted on the overflow pin from the hydraulic cylinder. Prior to displacement of the overflow pin by the excess charge, the overflow pin is maintained in an upwardly biased position that is level with the lower surface of the mold cavity. Once the displacement of the overflow pin is measured by the transducer, the measurement data may either be manually gaged and adjusted for subsequent runs or automatically gaged and adjusted by a microprocessor, which averages the overflow pin displacement for a set number of moldings and progressively sends adjustment signals to the feeding assembly to adjust, accordingly, the amount of the SMC sheet advanced, and therefore cut, for each molding. The microprocessor may also communicate with a regulator valve on the hydraulic cylinder of the charge overflow assembly to automatically adjust the hydraulic pressure required to keep the overflow pin in its upwardly biased position, so that the SMC molding pressure can be applied to the mold cavity without displacing the overflow pin, while still allowing displacement of the overflow pin in response to any excess SMC material forced into the mold cavity by the gate ram.

A preferred embodiment of the present invention incorporates a charge forming unit for preparing and handling the charge. The charge forming unit includes a feeding assembly for advancing the sheet material, a cutting assembly for cutting the sheet into strips, a rolling assembly for winding the strips of material into wrapped charges, and a loading assembly for placing the wrapped charge into the apertured gateway of the lower die. A preferred embodiment of the present invention further incorporates, as the rolling assembly, a wind-up fork that winds the SMC strip cut by the cutting assembly around its prongs to form the wrapped charge. The loading assembly, including a robotic arm, rotates the wind-up fork and loads the rolled charge into the apertured gateway.

Components produced using the wrapped charge of the present invention, like components produced using the traditional stamped stack charge, demonstrate good mechanical properties and dimensional stability, when the charge is provided with a resin that flows readily when heated and has relatively long fibers that enter the mold cavity undamaged. The present invention, however, overcomes many of the disadvantages of traditional charge forming techniques by providing a molding process that incorporates a simple and efficient means of charge preparation and manipulation, without compromising the strength of the resulting component.

BRIEF DESCRIPTION OF THE DRAWINGS

The present invention will be more fully understood by reference to the following detailed description of the preferred embodiments of the present invention, when read in conjunction with the accompanying drawings, in which like reference characters refer to like parts throughout the views, and in which:

FIG. 4 is a side elevational view of an injection molding apparatus according to the prior art shown in its closed position with the fluidized plastic material awaiting injection;

FIG. 5 is a view similar to that of FIG. 4, of an injection molding apparatus according to the prior art, showing the fluidized plastic material being injected;

FIG. 6 is a view similar to that of FIG. 5, of an injection molding apparatus according to the prior art, shown in its open position with a molded part being ejected;

FIG. 17 is a schematic representation of a fiber-reinforced plastic charge and its general distribution pattern according to the present invention;

DETAILED DESCRIPTION OF THE PREFERRED EMBODIMENT

It should be understood from the outset that the scope of the present invention need not be limited to the particular example used in connection with this invention since those skilled in the art will appreciate that its teachings can be used in a wide variety of applications.

As noted before, there are several processes that have been used in the past for the molding of reinforced thermosets. Specifically, for the processing of chopped fiber reinforced thermosets there are three primary higher volume processes currently in production, which are typically referred to as matched mold methods. These include compression molding, injection molding and transfer molding. It has been estimated that of all thermoset parts, as currently being produced (both reinforced and non-reinforced, including non-automotive applications), ten percent (by material weight) are transfer molded, sixty percent are injection molded, and thirty percent are compression molded. Other processes exist, such as the combination of injection and compression molding, as well as the liquid resin transfer processes, which are typically lumped together and known as liquid molding.

Figure 1:
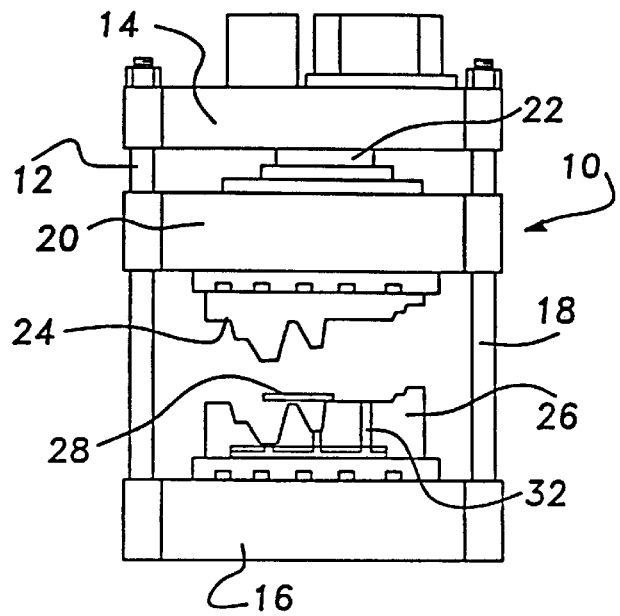
FIG. 1 is a side elevational view of a compression molding apparatus according to the prior art shown in its loaded and opened position.
Figure 2:
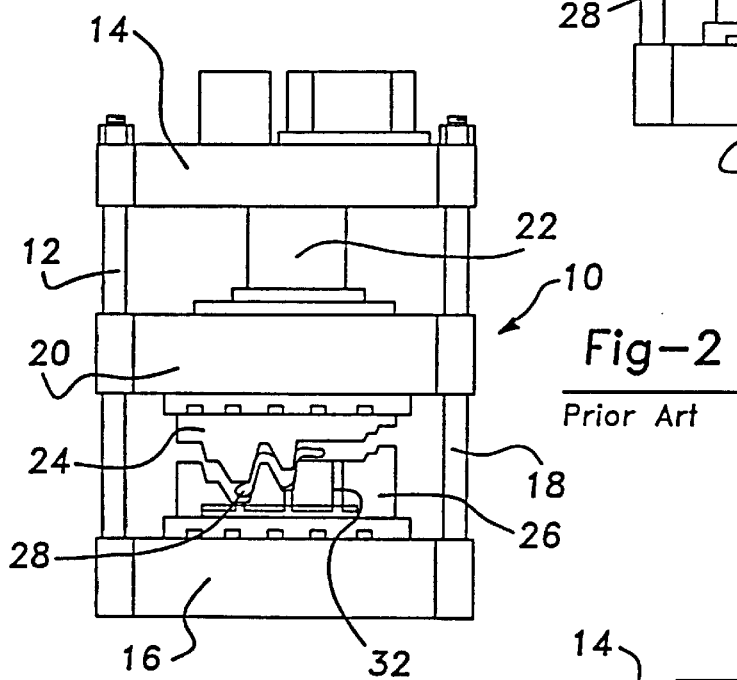
FIG. 2 is a view similar to that of FIG. 1, of a compression molding apparatus according to the prior art, shown moving toward its closed position.
Figure 3:
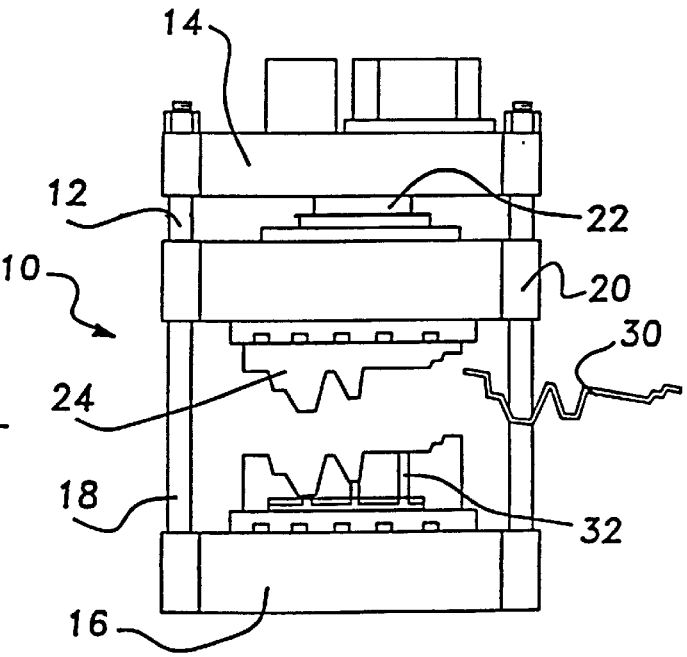
FIG. 3 is a view similar to that of FIG. 2, of a compression molding apparatus according to the prior art, shown in its opened position with a molded part being ejected.

FIGS. 1 through 6 demonstrate the prior art systems for processing fiber reinforced thermosets into molded body panels and related parts. FIGS. 1 through 3 illustrate an exemplary apparatus and method for compression molding. FIGS. 4 through 6 illustrate an exemplary apparatus and method for injection molding. (Transfer molding, discussed above, is also used for producing molded reinforced parts, but is generally limited to the production of intricate small parts and is generally unsuited for the production of vehicle panels.)

With respect to the prior art apparatus and method for compression molding illustrated in FIGS. 1 through 3, an exemplary compression molding apparatus is shown and generally illustrated as 10. Generally, the compression molding process consists of manually positioning a charge of a plastic material between matched upper and lower dies and closing the dies under pressure. The dies are heated to accelerate chemical cross-linking of the thermosetting plastic. The resulting part assumes the shape of the mold cavity defined between the upper and lower dies.

The apparatus 10 includes a frame 12 that comprises an upper fixed horizontal member 14, a lower fixed horizontal member 16, and a plurality of vertical supporting members 18. A movable horizontal member 20 is supported on the vertical supporting members 18. A hydraulic driver assembly 22 movably connects the movable horizontal member 20 to the upper fixed horizontal member 14 for selective upward and downward movement of the movable horizontal member 20 with respect to the upper fixed horizontal member 14.

Fitted to the lower side of the movable horizontal member 20 is a heated upper die 24. Fitted to the upper side of the lower fixed horizontal member 16 is a heated lower die 26. The dies 24 and 26 are matched such that a mold cavity is defined therebetween when the two dies 24 and 26 are at their closest operating proximity during the molding process.

In operation, a weighed charge 28 of sheet molding compound consisting of a chopped fiber-reinforced thermosetting plastic is positioned between the upper die 24 and the lower die 26 when the two halves are in their opened position as illustrated in FIG. 1. The two dies 24 and 26 of the apparatus 10 are then closed off stops and pressure is applied to the charge 28. The beginning of the compression process is illustrated in FIG. 2. Depending on the thickness and shape of the desired part, cycle times can range from less than a minute to several minutes. After adequate cycle time, the upper die 24 is returned to its opened position as illustrated in FIG. 3 and a finished part 30 is ejected by means of ejector pins 32 operably positioned within the lower die 26. An air popper (not shown) may also be used to eject the finished part.

Because the sheet molding compound is still flowing while the tool is being closed, shear edges (not shown) at the edge of the part must be used to insure that the cavity is sealed. The use of shear edges forces the use of squared component edges and limits the use of slides (also not shown) near the edges of the part. Because the presses used in the conventional compression molding operation are of the vertical type, as illustrated by the apparatus 10, the moldings usually cannot have undercuts that would make it difficult to extract the molding from the cavity without the use of these moving slides.

With respect to the prior art apparatus and method for injection molding of thermosets, as illustrated in FIGS. 4 through 6, an exemplary injection molding apparatus is shown and generally illustrated as 50. In general, the injection molding process comprises the steps of delivering thermosetting plastic compound to a relatively cool injection chamber and driving the material from the injection chamber by a plunger or screw into a relatively hot injection mold where the plastic compound is cured to form a component.

The apparatus 50 includes a fixed cross member 52 and a plurality of supporting members 54. A movable cross member 56 is movably positioned on the supporting members 54. A first die 58 is fitted to the fixed cross member 52. A second die 60 is fitted to the movable cross member 56. The dies 58 and 60 are matched such that a mold cavity 61 is defined therebetween when the dies 58 and 60 are brought to their closest proximity (on stops) during the molding process. A mold driver 62 drives the movable cross member 56 and its associated second die 60 between the dies' opened and closed positions.

A barrel 64 is mounted to the fixed cross member 52. A hopper 66 is mounted to the barrel 64. The barrel 64 includes a nozzle end 68 that is in fluid communication with the mold cavity 61. An injector member 70 (such as a ram or a screw) is movably provided within the barrel 64. Similarly, a pusher member 72 is movably provided within the hopper 66.

In operation, the second die 60 is positioned adjacent the first die 58 on stops to define the cavity 61 therebetween, as illustrated in FIG. 4. Thereafter, a quantity 74 of thermoset molding compound is injected into the cavity 61 by the force of the injector member 70 as illustrated in FIG. 5. The first and second dies 58 and 60, respectively, are heated relative to the barrel 64. (The mold temperature is generally elevated to between 300° and 325° F.) The heat and pressure produced by the force of the injector member 70 act to cure the molded article. After injection is completed, the quantity of plastic material (bulk molding compound) is replenished by the introduction of material into the barrel 64 from the hopper 66.

Cure time is approximately the same as for compression molded parts of equivalent thicknesses, although the overall cycle time of injection molding a part is shorter than that for compression molding The formation of a molded part 76 is completed after the appropriate cure time passes. Once the first and second dies 58 and 60 are moved apart, the molded part 76 is ejected with the assistance of ejector pins 78.

Figure 7:
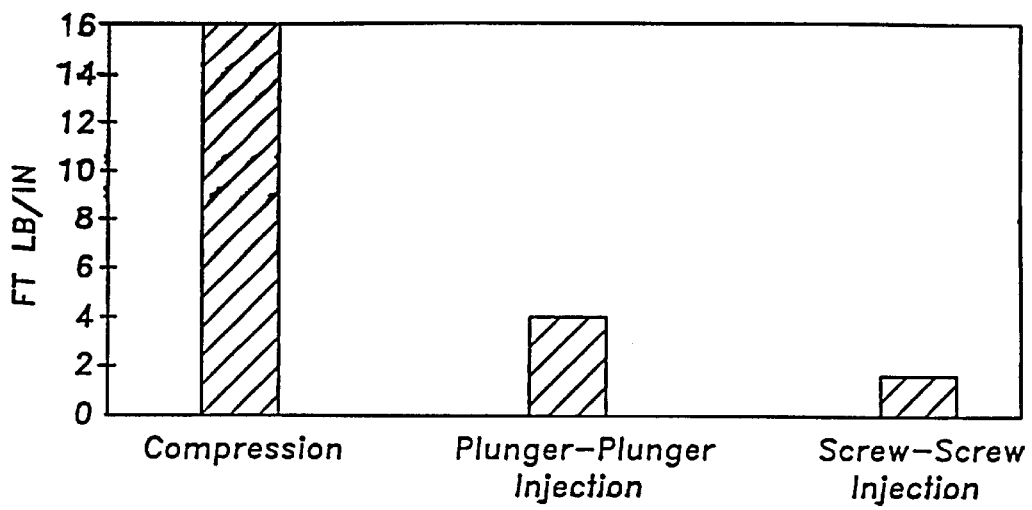
FIG. 7 is a graph illustrating Izod impact comparisons of compression molding and injection molding.
Figure 8:
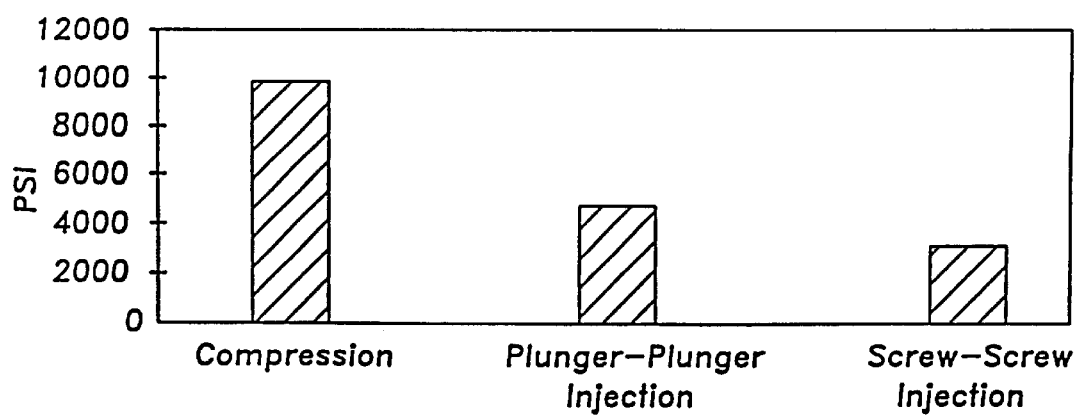
FIG. 8 is a graph illustrating tensile strength comparisons of compression molding and injection molding.

The major differences between compression molding and injection molding of thermoset molding compounds are the mechanical properties that are obtained in the molded part. For example, FIGS. 7 and 8 illustrate Izod impact and tensile strength comparisons for compression molding compared to injection molding for the same glass fiber content. Two feed mechanisms are identified along the X-axis for the injection molding process, plunger/plunger and screw/screw, which relate to the means by which the bulk molding compound is first transported from the hopper to the injection chamber and then from the injection chamber into the molding cavity. While properties for transfer molding are not readily available due to the typically small size of the molded parts, the resultant mechanical properties can be assumed to fall between those for compression and injection molding.

Figure 9:
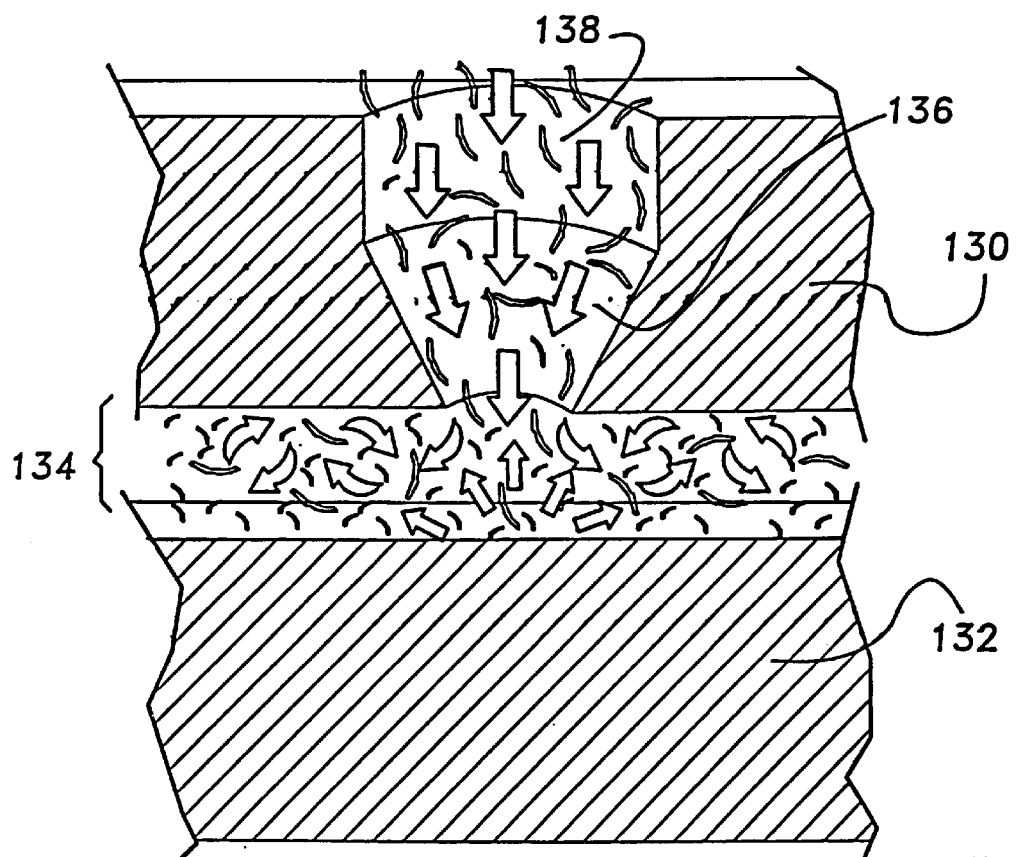
FIG. 9 is a cross-sectional, partial view of a mold cavity of a prior art injection molding apparatus defined by adjacent die halves with one of the halves having an injection gate formed therein and illustrating the injection of plastic and reinforcing fibers.

The significant results of FIGS. 7 and 8 are the 75 percent reduction in notched impact strength and the 60 percent reduction in tensile strength that are typically observed when injection molding is compared to compression molding. This degradation in mechanical properties with injection molding results from damage to the reinforcing fiber as a result of the injection process. FIG. 9 dramatically illustrates how fiber damage occurs according to conventional molding processes. In this figure, a cross-sectional, partial view of a mold cavity of a prior art molding apparatus illustrates a first die 130 and an adjacent die 132. A mold cavity 134 is defined between the two dies. An injection gate 136 is formed through the first die 130.

A quantity 138 of a flowable plastic material having reinforcing fibers is illustrated passing through the gate 136 and into the cavity 134. As shown, many of the fibers are damaged during the injection process. Fiber damage has several causes, including transportation of the material from one location in the process to another (with the screw transportation being more severe than the plunger transportation, as demonstrated in FIGS. 7 and 8), injection of the material through the small gate 136, impact of the material against the opposite surface of the tool as the material is forced to change directions by ninety degrees immediately upon exiting the injection gate 136, and the extensive flow in the mold as the material is often injected at one end of the mold and thereafter forced to flow to the opposite end of the cavity 134.

The present invention overcomes the difficulties typical of the traditional compression and injection molding processes. The present invention prevents damage to the reinforcing fibers by using a prepared charge which passes through an effective injection orifice that is large compared to the injection molding nozzle opening. Furthermore, in addition to the damage caused as the fibers pass through the small orifice of the injection molding nozzle, further damage results as the fibers move at a ninety degree angle as they pass from the nozzle tip into the relatively perpendicular mold cavity. Conversely, because the fibers of the charge according to the present invention are pre-positioned in random orientation in parallel horizontal planes, which are always parallel to the direction of initial flow, damage of the fibers during distribution of the resin within the mold cavity is also virtually eliminated.

Figure 10A:
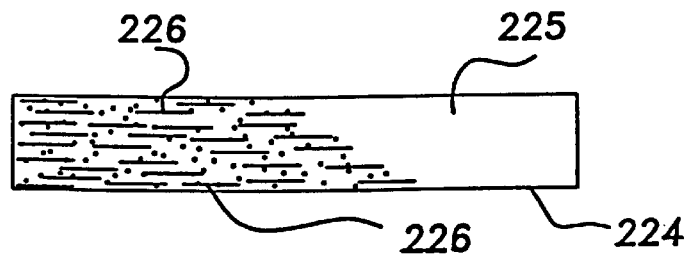
FIG. 10A is a cross-sectional view of a single layer of fiber reinforced plastic material according to the present invention.
Figure 10:
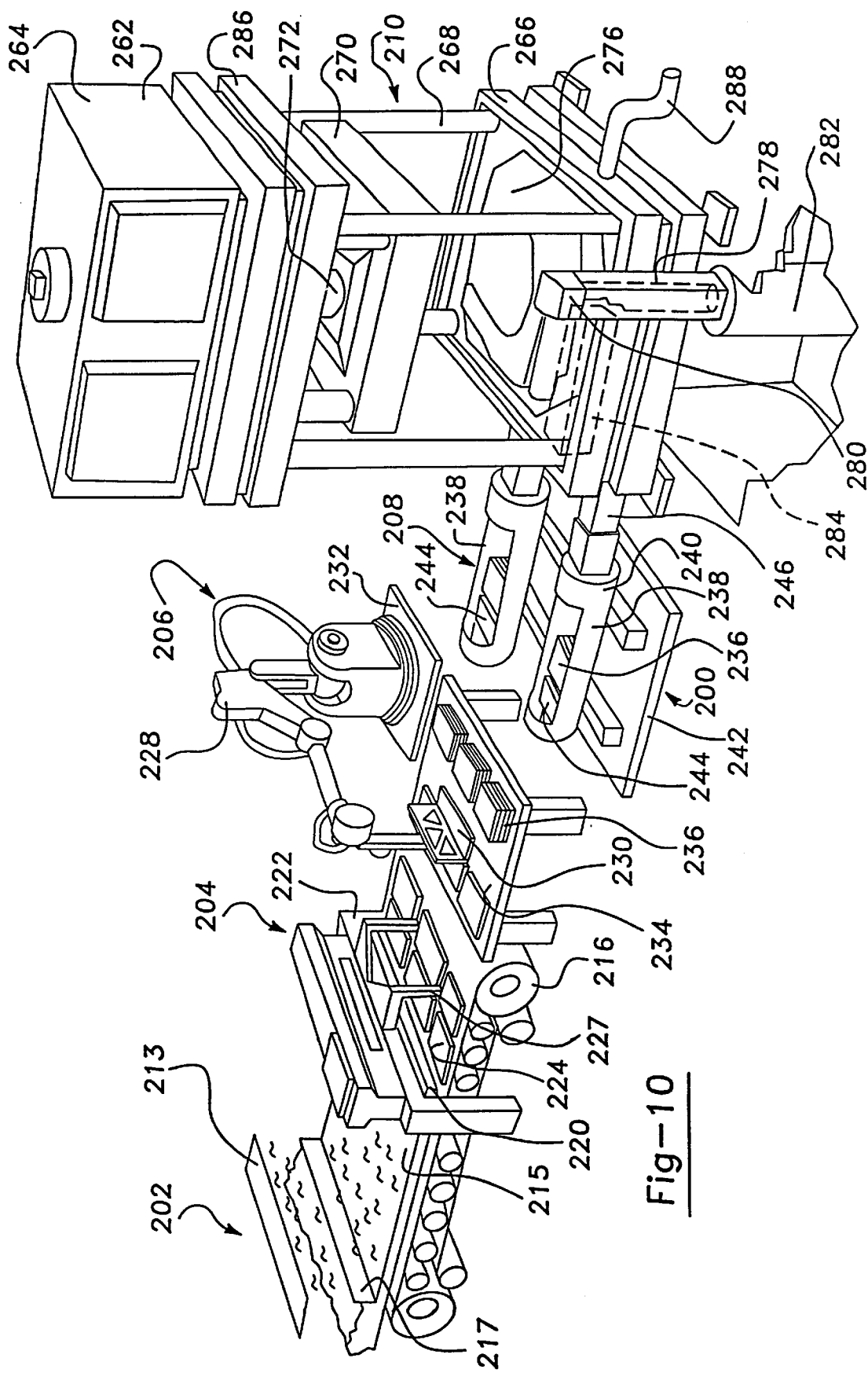
FIG. 10 is a perspective view of a charge preparation and molding apparatus according to the present invention.

With respect to FIG. 10, a transfer/injection molding apparatus is shown generally as 200. The apparatus 200 includes a sheet forming unit 202, a cutting unit 204, a layering unit 206, a charge shuttle unit 208, and a molding unit 210. A sheet 215 of resin paste is formed in substantially the same manner as sheet molding compound (SMC) is made in the industry although, perhaps, slightly thicker. A doctoring blade 217 controls the thickness of the resin paste and reinforcing fibers fall from choppers 213 onto the resin so that they all lie parallel to the major surface of the sheet (i.e., the horizontal plane), yet they are all randomly oriented in that plane.

The sheet of plastic material is passed into the cutting unit 204. The cutting unit 204 is controlled by a programmable computer (not shown) such that the resulting cut charges are formed according to selected, pre-programmed sizes. An elongated reciprocating cutting blade 220 supported by a frame 222 cuts the sheet into a plurality of regularly sized square or rectangular slabs 224 of thick molding compound. Each of the slabs 224 comprises a plastic portion 225 having interspersed reinforcing fibers 226, which are randomly dispersed in a manner that is still parallel to the sheet 215, as illustrated in FIG. 10A. An aligner 227 maintains the slabs 224 in a regular order on the conveyor 216 for delivery to the layering unit 206.

For purposes of this invention, the term "charge" means a material containing a resin that cures to a rigid, solid state. The charge, as used herein, comprises at least one slab and, typically, a plurality of layered slabs. The charge may be either square or oblong and may, in fact, embody a great variety of length-to-width ratios. The resin that may be used may be any material that provides the necessary bonding and strength for the composite article to be formed. Among typical resins are polyesters, vinyl esters, novalacs and epoxies. Preferred resin materials are thermally cured polyester resins having a modified molding viscosity index and modified gelation characteristics to enhance in-cavity flow.

The thermosetting resin is mixed with reinforcing fibers and various fillers. The fibers may or may not be pre-oriented in the resin. Typical fibers include polyamide fibers, polyester fibers, natural fibers and metal fibers. Preferably, the fibers are glass fiber strands and carbon strands. Glass fibers are presently the most preferred. The length of the fibers is preferably between 0.25" and 2.0", with the greater length being most desired. Because of the size of the initial charge and the flow characteristics of the resin, the initial lengths of the fibers remain unchanged through forming of the part. This compares favorably with injection molding, where the longest fibers are 0.5" and are broken up after injection, resulting in distribution of fiber length where the longest fibers are approximately 0.125", as well as with transfer molding, where the maximum initial length of the fibers in the charge is 0.5" or less and the final length of the fibers is considerably shorter, also due to breakage.

The layering unit 206 includes a robotic arm 228 or any other suitable form of automation having an L-bracket 230 at one end. The robotic arm 228 is pivotally mounted on a supporting structure 232. A table 234 receives the slabs 224 from the conveyor 216. Using the L-bracket 230, the arm 228 moves each of the slabs 224 from the table 234 and stacks them to form multiply-layered charges 236.

The charge shuttle unit 208 includes a pair of twin transfer shuttles 238. The twin transfer shuttles 238 allow for loading of one charge while the other one is in the molding cycle. Each of the transfer shuttles 238 includes an optionally preheated receiver 240 supported on a common reciprocating frame 242, a shuttle ram 244, and a closed transfer tube 246 for transferring the charge 236 between the shuttle 238 and the molding unit 210. The reciprocating frame 242 alternatingly moves each transfer shuttle 238 into alignment with a receiving passageway formed in the molding unit 210. After being stacked by the robotic arm 228 of the stacking unit 206, the charge 236 is moved by the arm 228 into the receiver (optional preheater) 240, where it is preheated for a given time. When the preheating cycle is completed, one of the shuttle rams 244 positions the charge 236 into the molding unit 210 while the arm 228 simultaneously positions another charge 236 into the other of the shuttle rams 244.

The molding unit 210 includes a frame 262 that comprises an upper fixed horizontal member 264, a lower fixed horizontal member 266, and a plurality of vertical supporting members 268. A movable horizontal member 270 is supported on the vertical supporting members 268. A hydraulic driver assembly 272 movably connects the upper fixed horizontal member 264 to the movable horizontal member 270 for selective upward and downward movement of the movable horizontal member 270 with respect to the upper fixed horizontal member 264.

Fitted to the lower side of the movable horizontal member 270 is a heated upper die 274 (seen in FIGS. 11 through 16). Fitted to the upper side of the lower fixed horizontal member 266 is a heated lower die 276. The dies 274 and 276 are matched such that a mold cavity is defined therebetween when the two dies 274 and 276 are brought to their stops at their closest operating proximity.

A transfer pot 278 is formed in the lower fixed horizontal member 266 and includes therein a vertically movable platform 280. The passageway 278 terminates at a charge entrance 279 (seen in FIGS. 11–16) defined in the cavity-side of the lower die 276. The charge entrance 279 is shown as being generally centrally located in the mold cavity, although this need not be the case.

The charge entrance 279 defines an opening which represents about 1–5 percent of the mold's surface area in the case of structural components and about 1–20 percent in the case of exterior body panels. The initial orientation of the fibers on entry into the mold cavity is approximately parallel with the molding surfaces of the cavity and maintain this orientation as the resinous carrier fills the cavity. As a result, the fibers are undamaged throughout the molding process.

The platform 280 is driven by a hydraulic platform driver 282. A horizontal passageway 284 is also formed in the lower fixed horizontal member 266 for transporting the stacked charge 236 from the closed transfer tube 246 of the shuttle unit 208 into the molding unit 210.

The molding unit 210 includes provisions for a vacuum chamber to be temporarily formed around the mold cavity. Class "A" molded composite structures, which are required for exterior automotive body panels, are formed with show surfaces that exactly duplicate the mold surfaces, without any distortions or surface imperfections. The opportunity for surface imperfections, especially long term waviness, is increased as the flow distance is increased. The use of a vacuum can greatly assist in the prevention of some types of surface imperfections. Accordingly, a vacuum is preferably used in conjunction with the mold process of the present invention.

In one embodiment of the present invention, a sealing shroud 286 is fitted to the upper fixed horizontal member 264. After the two molds 274 and 276 are moved to their stopped position, the sealing shroud 286 extends to sealingly contact the upper side of the lower fixed horizontal member 266. A vacuum line 288 connected to a vacuum pump (not shown) is provided to draw a vacuum around the mold cavity during the molding operation. More details on the vacuum process in relation to molding may be found in the following United States patents, commonly assigned to the assignee of the present application, and all incorporated by reference: U.S. Pat. No. 4,488,862, issued on Dec. 18, 1984 to Epel et al. for COMPRESSION MOLDING APPARATUS HAVING VACUUM CHAMBER; U.S. Pat. No. 4,551,085, issued on Nov. 5, 1985 to Epel et al. for COMPRESSION MOLDING APPARATUS HAVING VACUUM CHAMBER; U.S. Pat. No. 4,612,149, issued on Sep. 16, 1986 to Iseler et al. for COMPRESSION MOLDING A CHARGE USING VACUUM; U.S. Pat. No. 4,855,097, issued Aug. 8, 1989 to Iseler et al. for COMPRESSION MOLDING A CHARGE USING A VACUUM; and U.S. Pat. No. 5,130,071, issued on Jul. 14, 1992 to Iseler et al. for VACUUM COMPRESSION MOLDING METHOD USING PREHEATED CHARGE.

FIGS. 11 through 16 illustrate steps of operation of the molding unit 210 of the present invention. It should be understood that the steps according to the following description are merely exemplary and modifications to the following steps may be made by one skilled in the art without deviating from the spirit or scope of the present invention.

Figure 11:
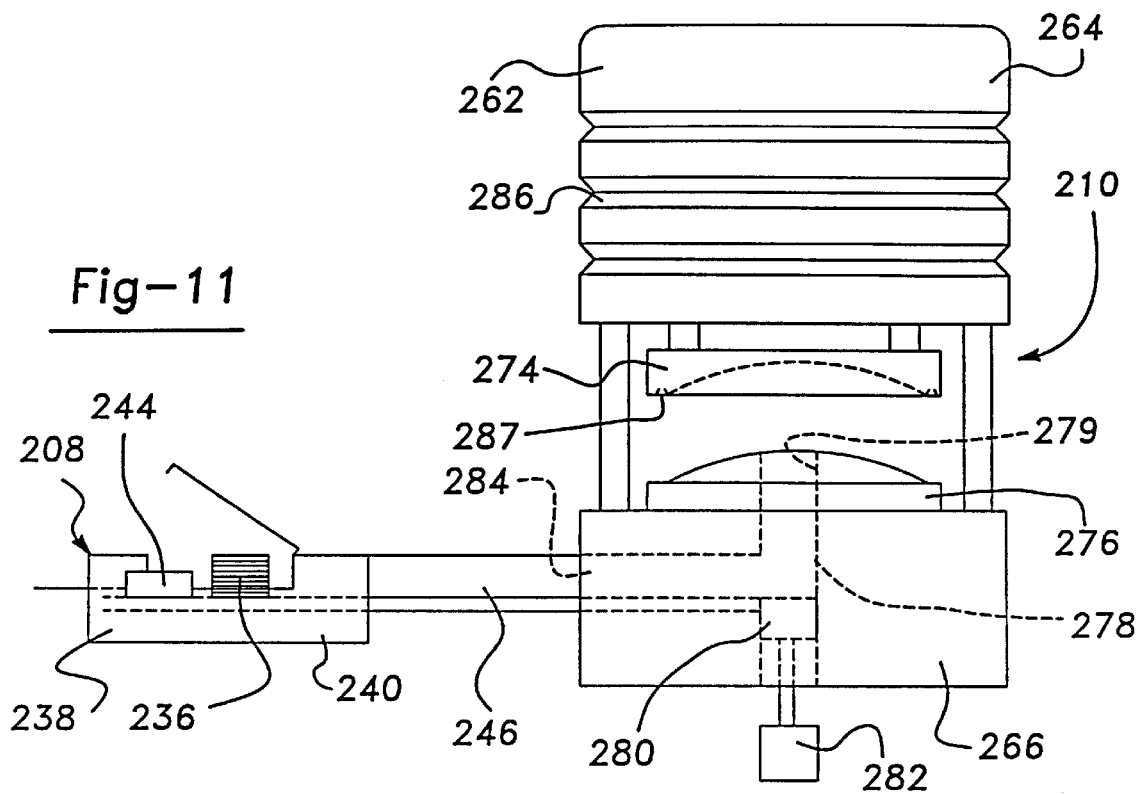
FIG. 11 is a side elevational view of a molding apparatus according to the present invention showing the molding halves in their opened position and a stacked charge positioned within an optionally preheated receiver.

With reference to FIG. 11, the upper die 274 is shown in its opened position, defined by its spaced apart relation with respect to the lower die 276. While the vacuum shroud 286 is in its retracted position, the robotic arm 228 positions the charge 236 in the receiver 240 of one of the twin transfer shuttles 238 for (optional) preheating. Additional preheating of the charge 236 prior to preheating by the receiver 240 may be made by an additional preheater (not shown). It should be understood that because the shuttle unit 208 preferably comprises twin transfer shuttles 238, during normal operation, a charge 236 is positioned in the receiver 240, while a part is molded in the molding unit 210. However, for the sake of clarity, the procedure is described as only a single molding procedure.

Figure 12:
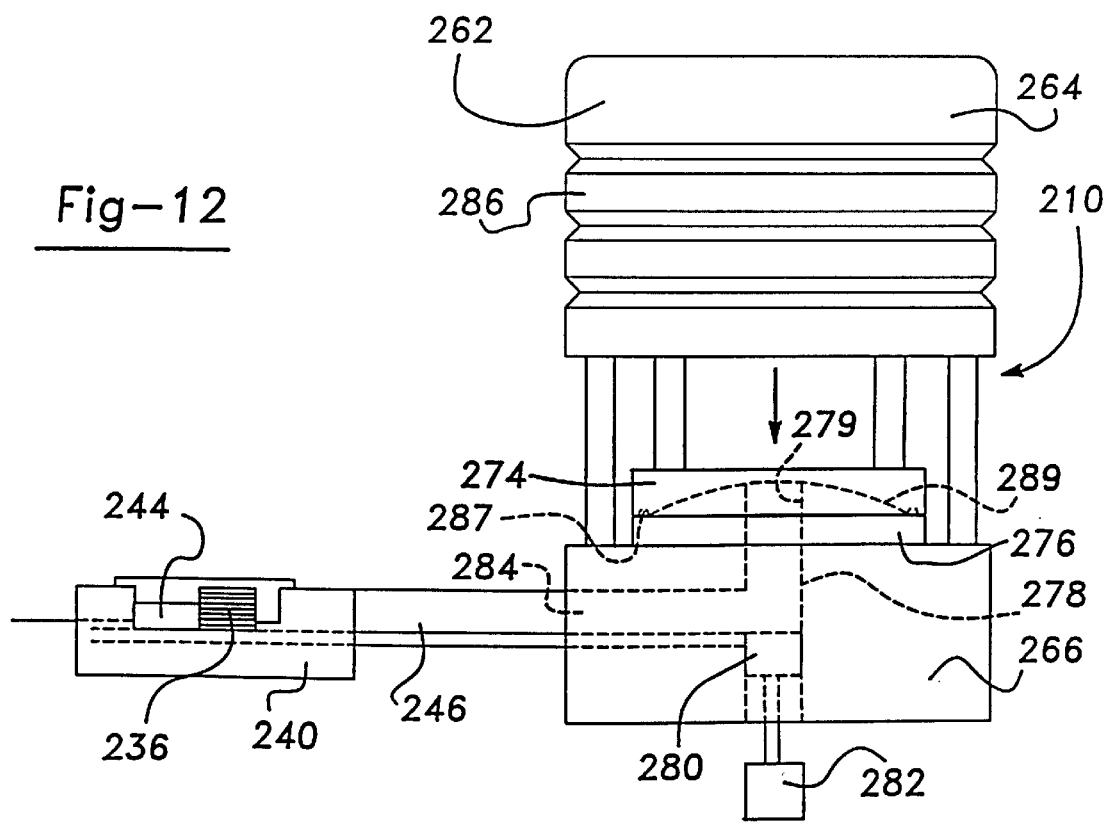
FIG. 12 is a view similar to that of FIG. 11, illustrating the upper die moved to its closed position with respect to the lower die and showing the cover of the receiver also in its closed position.

While the upper die 274 is moved into position above the lower die 276, defining a cavity 289 therebetween, the charge 236 remains in the receiver 240, as shown in FIG. 12. Movement of the upper die 274 and the lower die 276 is halted by mold stops, which precisely define the size of the cavity 289. Because the upper die 274 and the lower die 276 are in their closed positions prior to the molding operation, no shear edges are required, thus allowing for the production of relatively intricate parts. One or more overflow channels 287 are formed in the mold to allow passage of excess charge material. Excess material (not shown) may be trimmed away after the molding process is completed.

Figure 13:
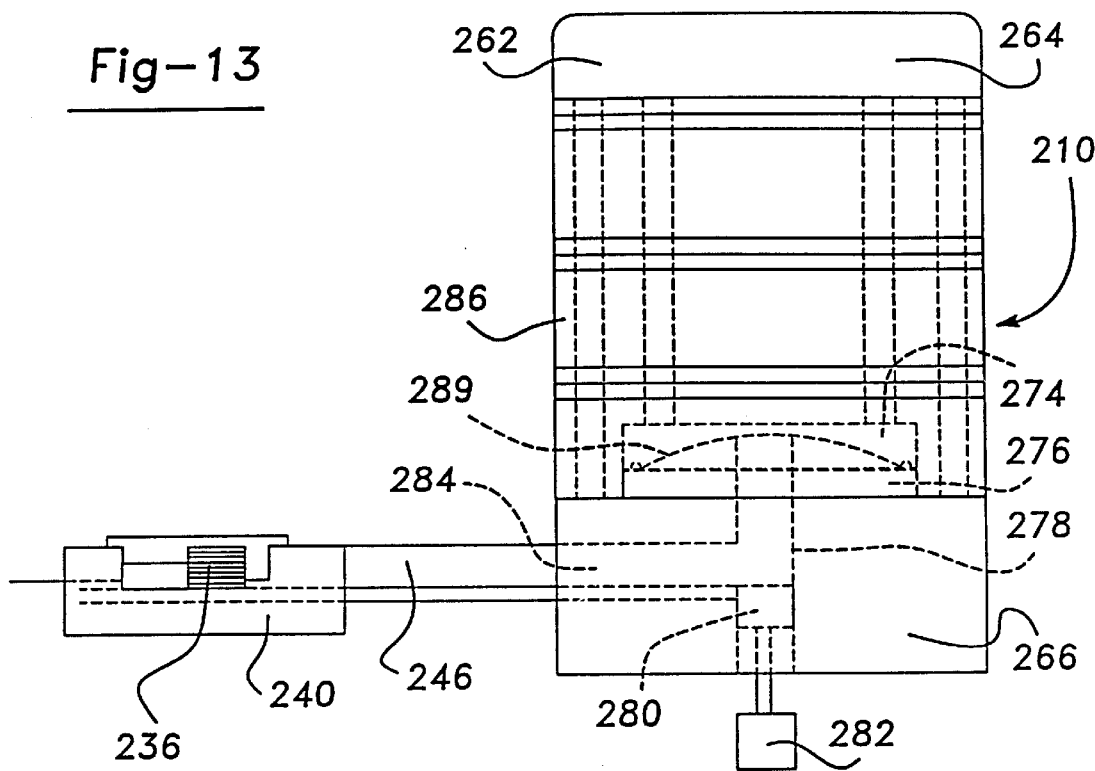
FIG. 13 is a view similar to that of FIG. 12, illustrating the mold vacuum shroud in its extended and sealed position with the mold closed on stops.

With respect to FIG. 13, the vacuum shroud 286 is moved to its extended, sealed and vacuum-ready position. The lower end of the shroud 286 is sealingly mated with the upper surface of the lower fixed horizontal member 266 to thereby form a temporary, vacuum-tight seal such that a vacuum may be formed around and in the cavity 289.

Figure 14:
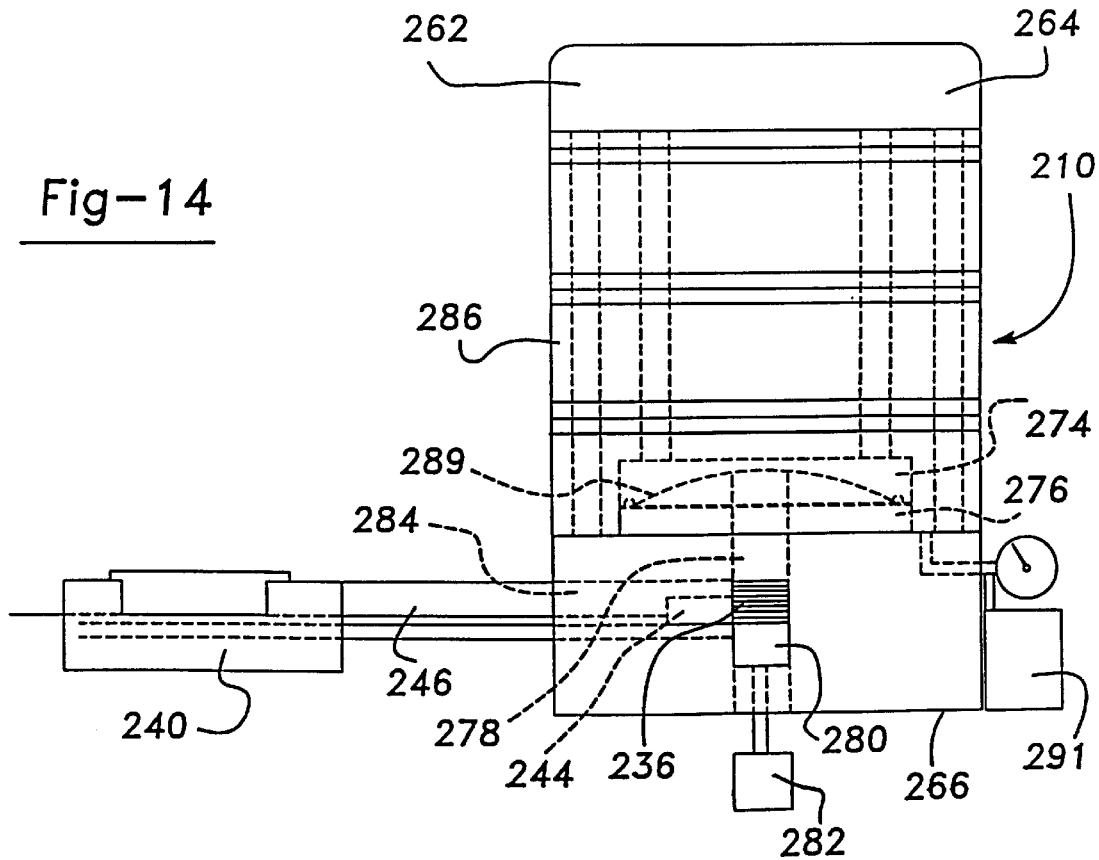
FIG. 14 is a view similar to that of FIG. 13, illustrating the preheated stacked charge moved to its pre-injection position above the movable platform.

The preheated charge 236 is then moved into position by the shuttle ram 244, as seen in FIG. 14. The preheated charge 236 passes from the receiver 240 of one of the transfer shuttles 238 through the closed transfer tube 246 and the horizontal passageway 284 formed in the lower fixed horizontal member 266 and then onto the upper surface of the platform 280. Once the charge 236 is in position on top of the platform 280, a vacuum pump 291 is engaged to create a temporary vacuum around the cavity 289. The inner wall of the shuttle ram 244 partially forms a fourth wall of the vertical passageway 278, thus enabling a vacuum to be formed within the cavity 289. The vacuum is useful in assuring that the flowable plastic is deposited completely into all of the crevices of the cavity 289.

Figure 15:
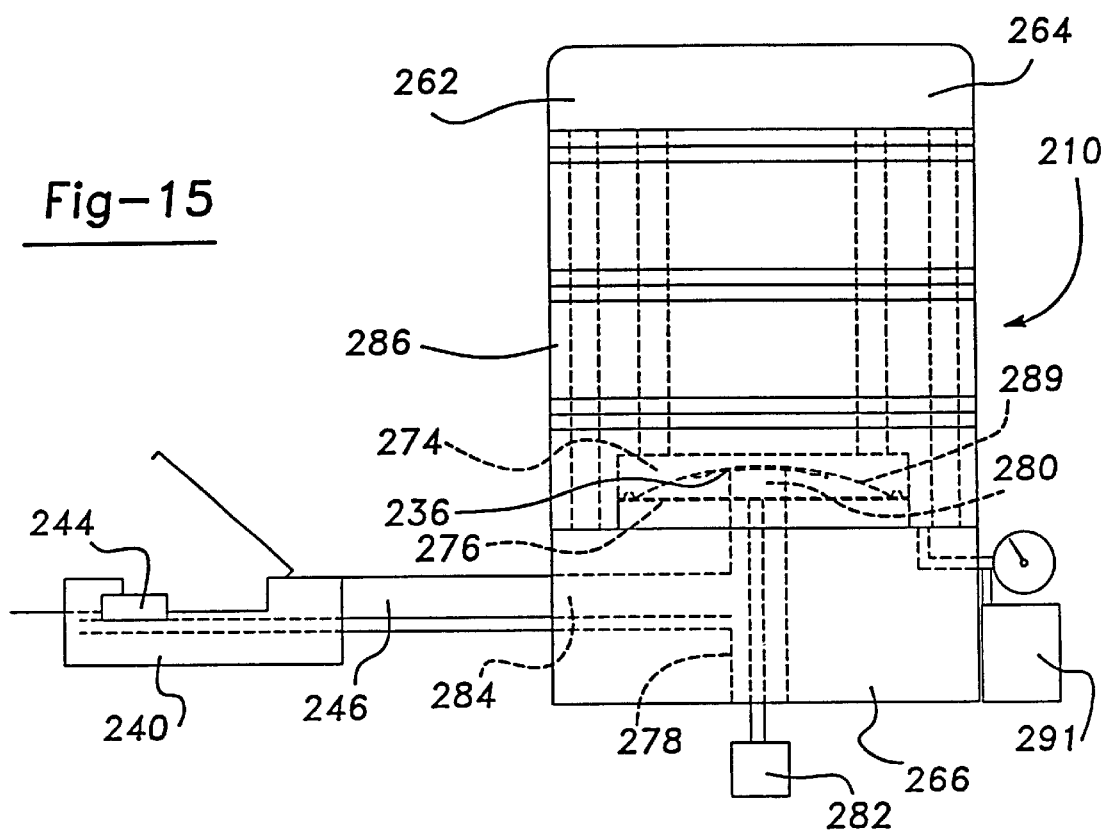
FIG. 15 is a view similar to that of FIG. 14, showing the charge distributed within the mold cavity.

With reference to FIG. 15, the platform 280 is moved vertically into its compressing position, forcing the charge 236 (under a vacuum) into the cavity 289. The reinforcing fibers are distributed throughout the cavity 289 with minimal or no deterioration, as will be described more fully below.

Figure 16:
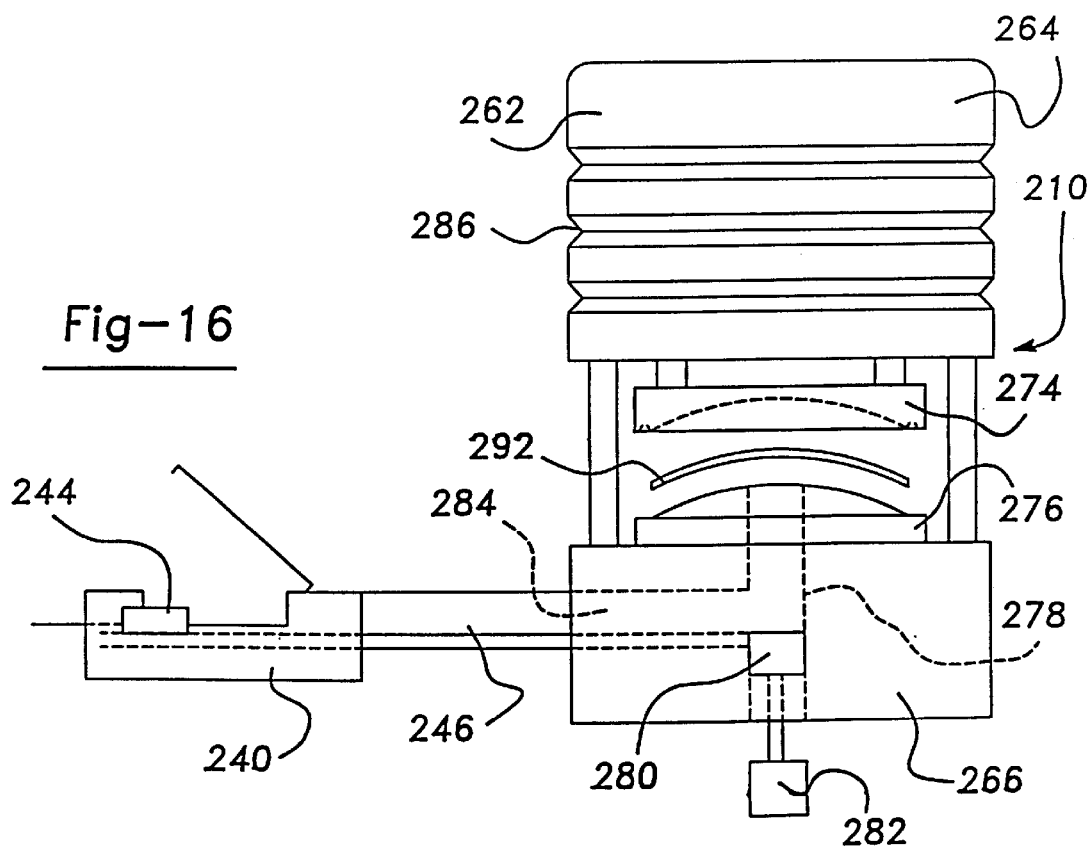
FIG. 16 is a view similar to that of FIG. 15, showing both the shroud and the upper die in their retracted positions and the molded part being ejected.

The last step of the molding process of the present invention is illustrated in FIG. 16. A vacuum release valve (not shown) is opened to equalize the pressure within the vacuum shroud 286 with that of ambient air at any time after the mold cavity is filled. The vacuum shroud 286 is retracted as is the upper die 274. A finished part 292 is ejected, the ejection of which may be assisted by ejector pins as may be necessary depending on the particular component.

As noted above, the present invention overcomes the problem of deterioration of reinforcing attendant known plastic molding methods. Essentially, the problem is overcome by providing a relatively large, multi-layered prepared charge having reinforcing fibers. The fibers are pre-positioned in each layer in parallel but otherwise random orientation, thereby assuring that the fibers will remain substantially parallel to each other and to the direction of initial flow as the charge enters the mold cavity.

The principles which underlie the ability of the present invention to preserve the reinforcing fibers throughout the molding process are generally demonstrated in FIG. 17. In this figure, two dimensional flow of the material is illustrated by arrows 294, while pressure on the charge 236 effected by the platform 280 is illustrated as the arrow 296. By positioning the fibers 298 according to the layering process of the present invention so that the fibers lie substantially horizontally in the charge 236 in a plane which is always parallel to the initial direction of flow, there is no damage from the condition depicted in FIG. 9. The initial height of the charge 236 and the initial mold surface coverage are flow-related issues that are optimized on a case-by-case basis according to the part and the material.

Figure 18A:
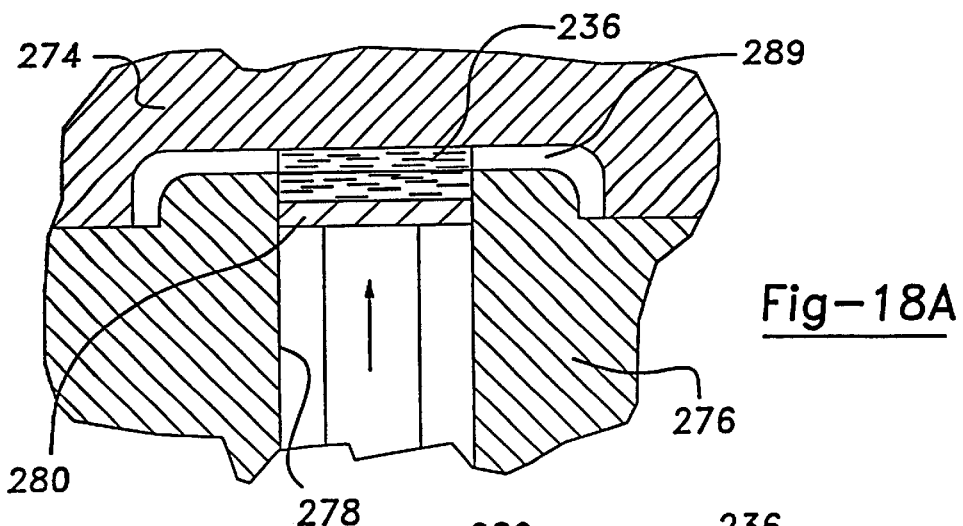
FIG. 18A is a sectional view taken of two die halves in their closed position with the charge positioned partially in the mold cavity.
Figure 18B:
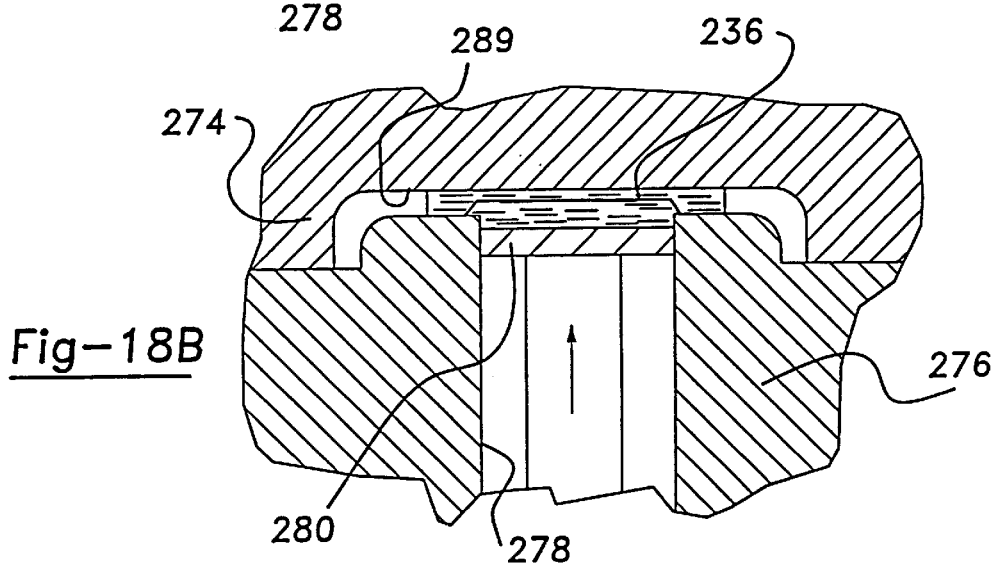
FIG. 18B is a sectional view similar to that of FIG. 18A, illustrating the charge beginning to be forced along the space defined by the mold cavity.
Figure 18C:
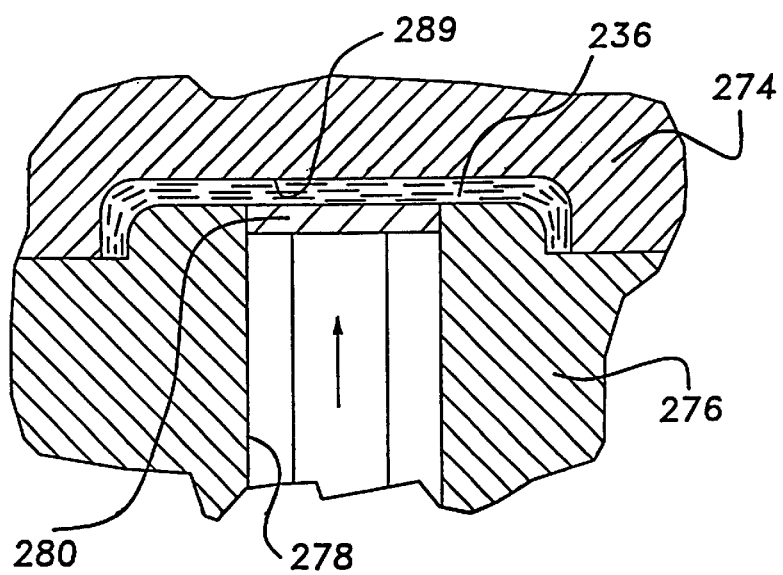
FIG. 18C is a sectional view similar to that of FIG. 18B, illustrating the charge fully injected into the mold cavity.

FIGS. 18A through 18C illustrate the progression of the charge 236 from the transfer pot 278 and into the cavity 289. With respect to these figures, the upper die 274 is closed upon the lower die 276 defining the mold cavity 289. The platform 280 is reciprocatingly positioned in the transfer pot 278.

In FIG. 18A, the platform 280 is in a retracted position where the charge 236 is positioned on the top of the upper surface of the platform 280 and is in contact with the cavity surface of the upper die 274. It should be appreciated that the general configuration of both the charge 236 and the platform 280 is only exemplary and not intended as limiting. For example, while the charge 236, as shown, comprises any two slabs layered one atop the other, the charge 236 may comprise any one slab or may be more than the two illustrated. The horizontal configuration of the fibers is clearly seen in the charge 236.

FIG. 18B illustrates the next step of the injection process where the platform 280 has continued to move against the bottom of the charge 236 such that the top of the charge 236 has begun to spread out through the cavity. The fibers, however, remain roughly parallel with the upper and lower mold surfaces defining the cavity 289. In addition, the charge may be cylindrically shaped.

FIG. 18C illustrates the final step of the injection process, wherein the platform 280 is in its fully extended, top dead-center position and the charge 236 is fully injected into the cavity 289. In this position, the upper surface of the platform 280 acts as part of the cavity wall of the lower die 276. The fibers have retained their substantially horizontal configuration and remain largely intact.

Prevention of damage to the fibers is related to the value of the "effective injection nozzle" for placement of the resin and fibers into the cavity. FIGS. 18A–18C illustrate the relatively wide "injection opening" of the transfer pot 278. While the tip opening of the injection nozzle of the conventional injection molding apparatus varies depending on the application, the opening is generally no more than 0.50" in diameter. Accordingly, the value of the "effective injection nozzle" of the largest injection molding apparatus is equal to $(0.25")^2 \times \pi$, or approximately $0.2"^2$.

Conversely, the value of the "effective injection nozzle" of the present invention is considerably larger than the same value of the prior art injection molding apparatus. Given, for example, a charge having a perimeter of 24.0" (representing 6.0" on each side) and a part thickness of, again for example, 0.1", the "effective injection nozzle" of the present invention is equal to $24.0" \times 0.1"$, or $2.4"^2$. Compared with the prior art injection nozzle, the present invention represents an improvement in the value for the "effective injection nozzle" by a ratio of more than 10:1. Fibers passing through the nozzle of conventional injection molding machines are first damaged as they are squeezed through the narrow opening in the nozzle tip and are further damaged as they pass at an approximate ninety degree angle from the injector nozzle into the mold cavity. Fibers introduced into the mold cavity according to the present invention escape damage at the first step because no squeezing results as the charge passes from the transfer pot 118 into the mold cavity. And given the pre-orientation of the fibers within the charge 236, as the charge 236 is compressed from the bottom and is forced to spread into the cavity at the top, the resin (and its fibers) spreads out in a parallel configuration relative to the mold cavity. Accordingly, both orifice-passing damage and cavity-entering damage are eliminated by the method and apparatus of the present invention.

Figure 19:
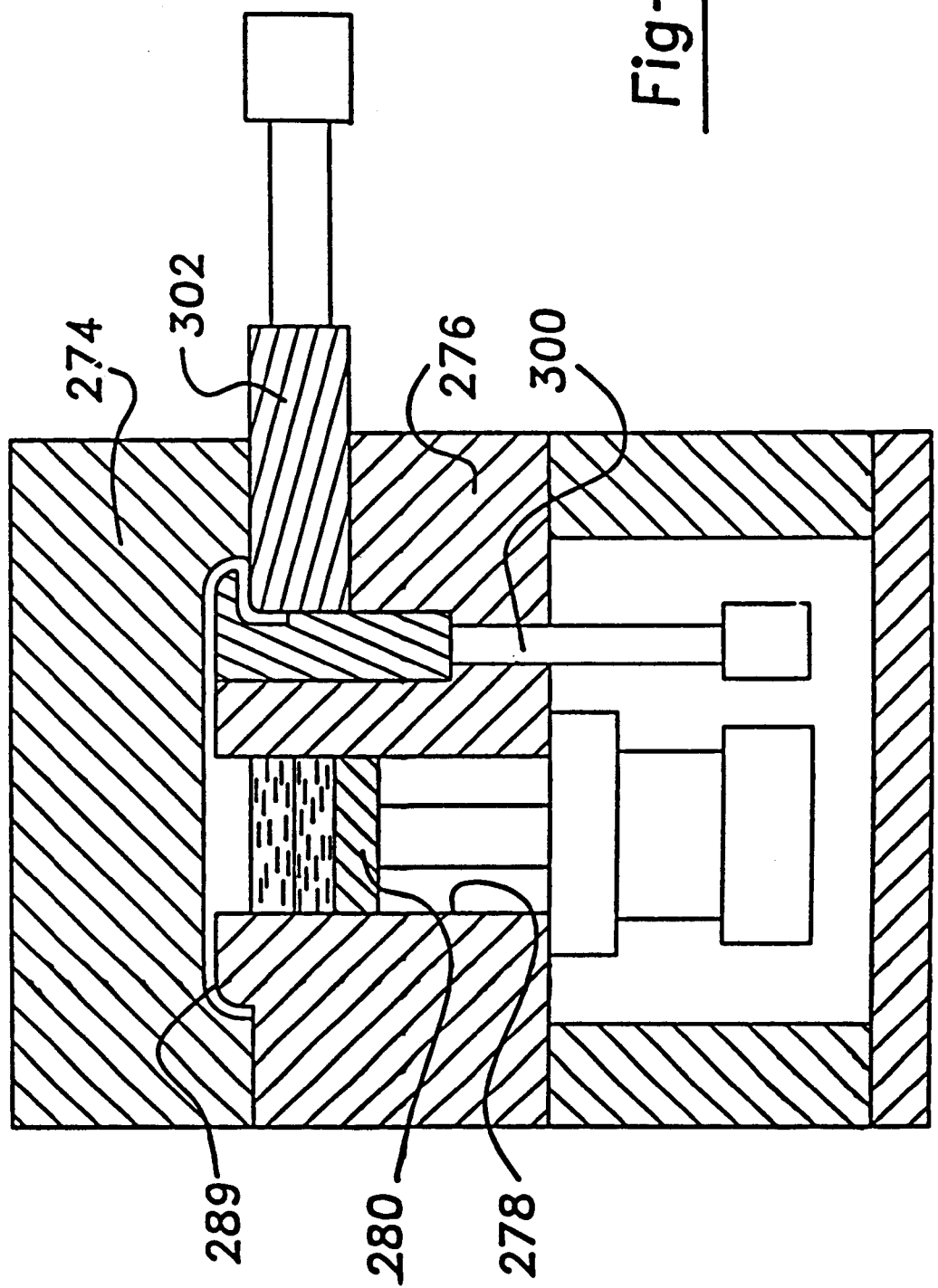
FIG. 19 is a sectional view similar to that of FIGS. 18A–18C, without the charge in place and illustrating a preferred method of forming angular portions of the molded component.

FIG. 19 illustrates a cross-sectional view of an alterative mold assembly for producing a part according to the present invention. While the assembly illustrated in FIG. 19 is similar to that illustrated in FIGS. 18A–18C, the assembly of FIG. 19 incorporates features to enhance the versatility of the present invention. Specifically, because the apparatus of the present invention allows for the molding of complex parts in a single operation (including the outer skin and inner structural elements of vehicle body components as set forth below with respect to FIGS. 21 and 22), modifications to the mold assembly are necessary.

Accordingly, the assembly of FIG. 19 illustrates a lifter 300 associated with the lower die 276 and a slide 302 positioned between the upper die 274 and the lower die 276. The lifter 300 and the slide 302 allow for the molding of complex angles and for the removal of the component after curing. While the lifter 300 and the slide 302 are shown in the same assembly for illustrative purposes, it should be understood that one could be used without the other.

Figure 20:
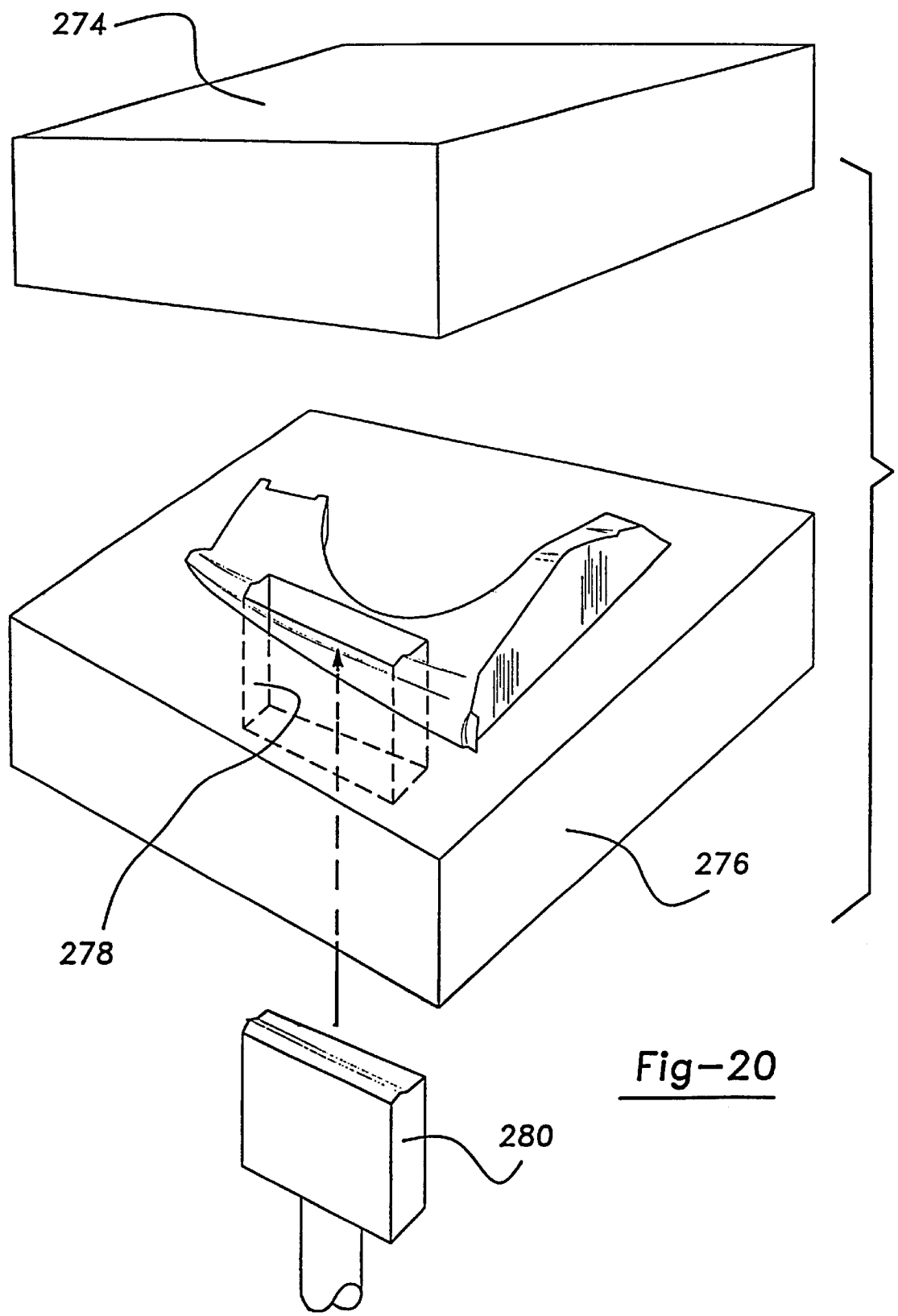
FIG. 20 is an exploded view of the upper and lower dies and the movable platform.

Further, FIG. 20 illustrates the versatility of the present invention and an exploded perspective view of each of the dies 274 and 276 and the platform 280, relative to each other. The upper surface of the platform 280 is a segment of the mold surface of the lower die 276, which has been "removed" to allow formation of the transfer pot 278. Accordingly, when the platform 280 is raised to its maximum injection position as illustrated in FIG. 18C, the upper surface of the platform 280 substantially forms a continuous surface with the upper surface of the lower die 276, thus eliminating, or at least minimizing, surface imperfections on the underside of the finished product.

Figure 21:
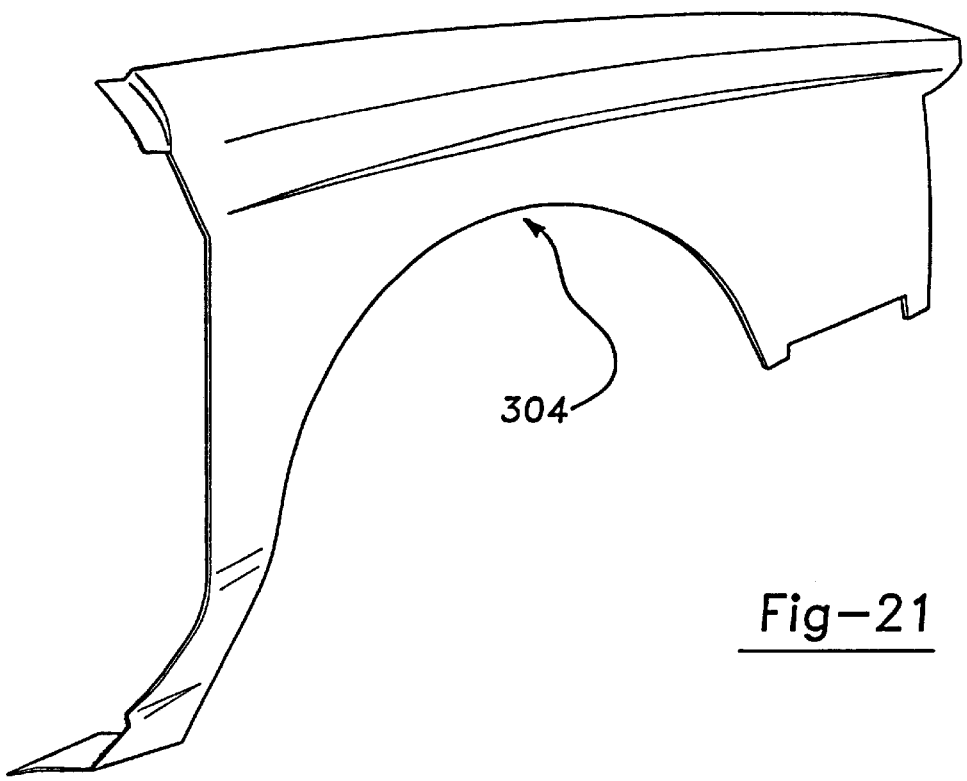
FIG. 21 is a perspective view of the exterior of an article molded according to the method and apparatus of the present invention.
Figure 22:
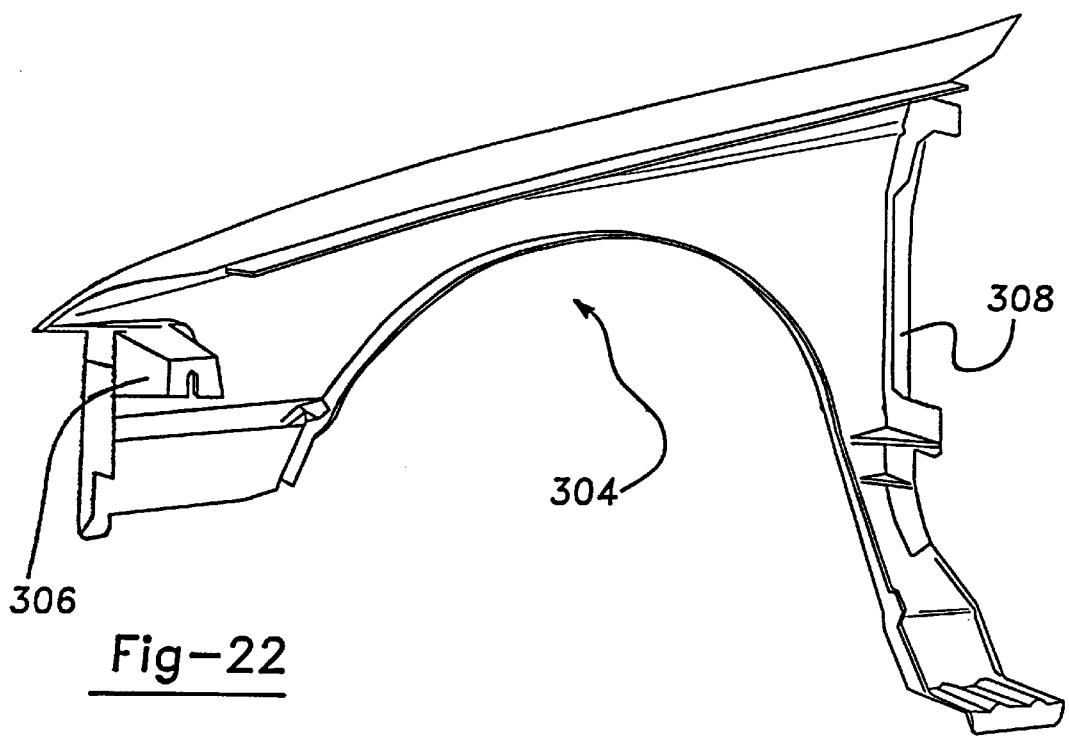
FIG. 22 is a perspective view of the interior of the article of FIG. 21.
Figure 23:
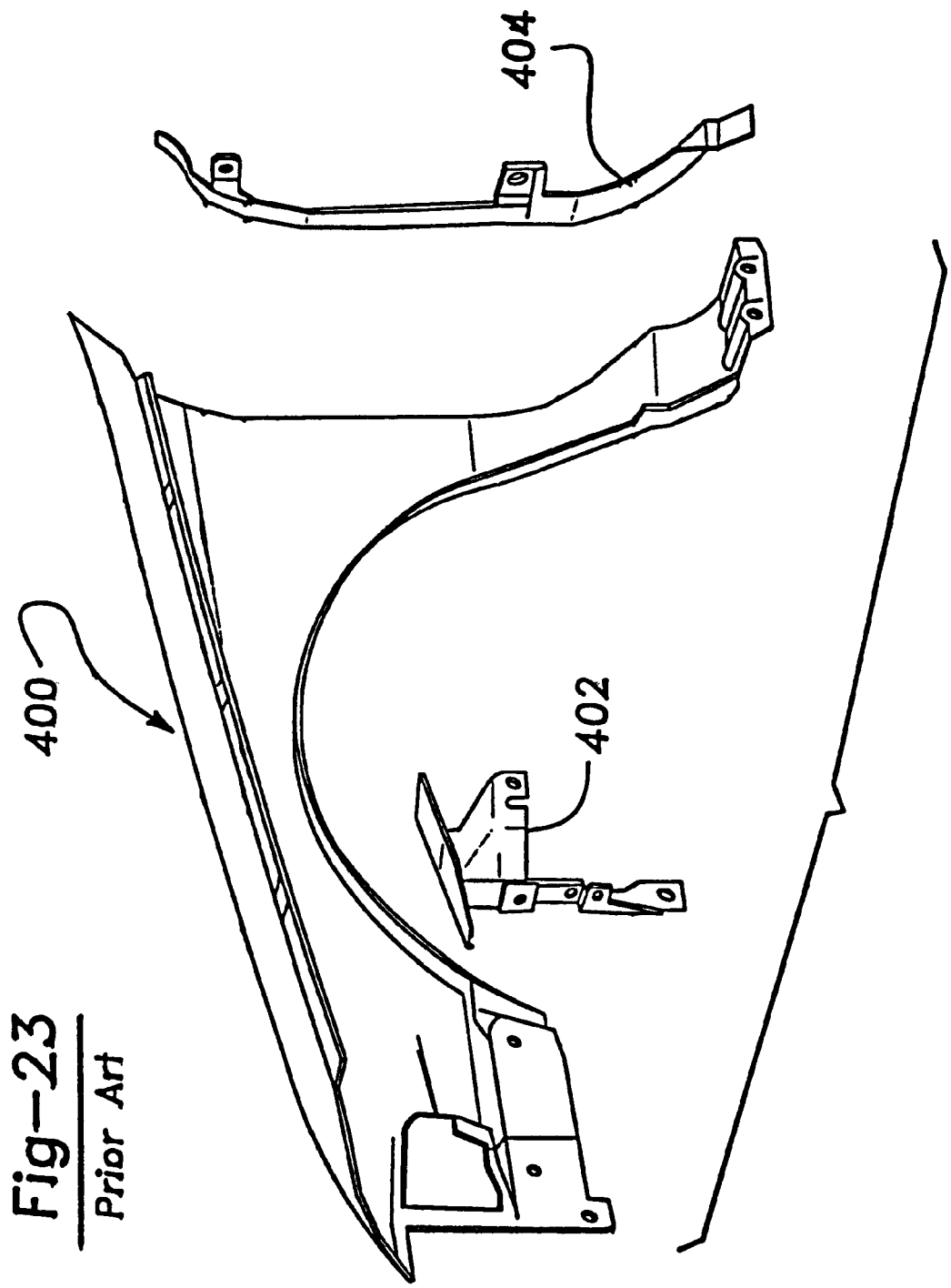
FIG. 23 is an exploded perspective view of the interior of a fender produced according to prior art techniques and illustrating the separate structural components.

The component produced by the apparatus of the present invention in accordance with the above-described method may be a complex, vertical or horizontal member, as illustrated as a one-piece automobile fender generally shown as 304 in FIGS. 21 and 22. The fender 304 includes integrally formed nose and rear reinforcements 306 and 308, respectively. The fender 304 of FIGS. 21 and 22 represents a significant improvement over the prior art, such as a fender 400, as illustrated in FIG. 23, which requires physical attachment (such as by mechanical fastening or chemical adhesion) of a nose reinforcement 402 and a rear reinforcement 404 in a secondary operation.

While a fender has been illustrated as a product of the method and apparatus of the present invention, it should be understood that the scope of the invention need not be so limited, since those skilled in the art will appreciate that its teachings can be used in a much wider variety of applications, such as on other parts found in motor vehicles, including doors, engine hoods, trunk lids, roofs, firewalls, inner fenders, radiator supports, valve covers, and cross car beams.

Figure 24:
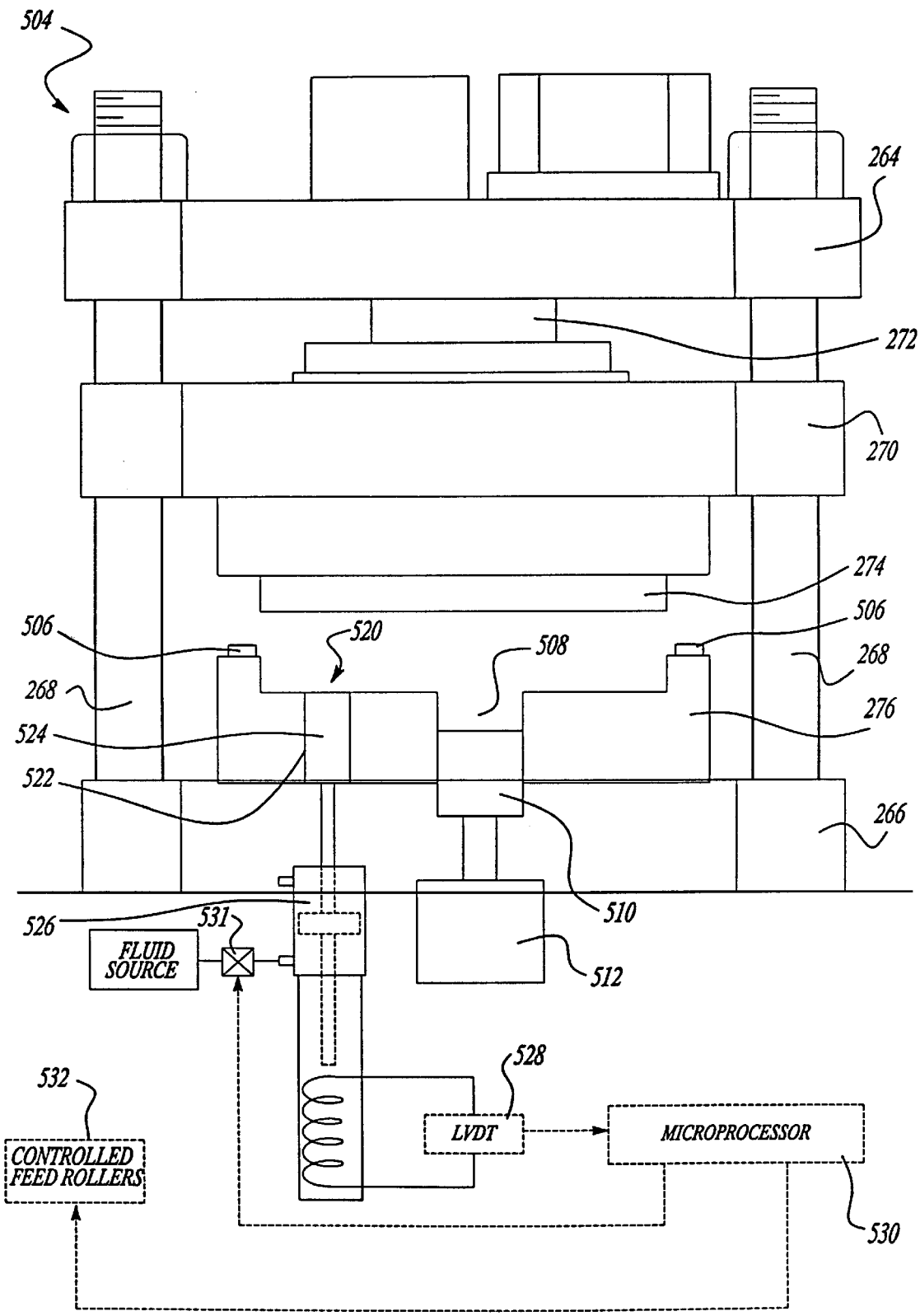
FIG. 24 is a sectional view taken of an embodiment of a molding apparatus according to the present invention, showing the die halves in their opened position.

With reference to FIGS. 24–32, an embodiment of a molding apparatus 500 is generally shown. The apparatus 500 includes a charge forming unit 502 and a molding unit 504. The molding unit 504, as illustrated in FIG. 24, generally resembles the molding unit 210, including the upper fixed horizontal member 264, the lower fixed horizontal member 266, and the plurality of vertical supporting members 268. Further, the movable horizontal member 270 is supported on the vertical supporting members 268 and the hydraulic driver assembly 272 movably connects the upper fixed horizontal member 264 to the movable horizontal member 270 for selective upward and downward movement of the movable horizontal member 270 with respect to the upper fixed horizontal member 264.

With continued reference to FIG. 24, fitted to the lower side of the movable horizontal member 270 is the heated upper die 274; and, fitted to the upper side of the lower fixed horizontal member 266 is the heated lower die 276. Stops 506 are positioned on the lower die 276 for stopping movement of upper die 274 upon lower die 276 and positioning the dies 274 and 276 at their closest operating proximity, such that the mold cavity 289 is defined therebetween.

An apertured gateway 508 is formed in the lower fixed horizontal member 266 and includes therein a vertically movable gate ram 510. The apertured gateway 508 terminates flush with the cavity-side of the lower die 276. The gate ram 510 is driven by a ram hydraulic cylinder 512.

As will be further detailed, FIG. 24 further illustrates a charge overflow assembly 520, which is adapted to be formed within the lower fixed horizontal member 266, such that, upon over-filling of the mold cavity 289, the charge overflow assembly receives and measures the excess material. According to a preferred embodiment, the charge overflow assembly 520 includes an overflow cavity 522 and an overflow pin 524 movably disposed therein by an overflow hydraulic cylinder 526. Charge overflow assembly 520 further includes a displacement sensing transducer 528 attached to the overflow pin 524, so that the depth of the overflow pin displacement can be measured as excess material is displaced within the overflow cavity 522 and the measurement data can be sent to a microprocessor 530. The displacement of the overflow pin 524 is averaged for a set number of moldings by the microprocessor 530, which then progressively sends adjustment signals to the charge forming unit 502, so that the amount of SMC material used for the subsequent molding may be increased, decreased or left constant, as required.

The microprocessor 530 also communicates with a regulator valve 531 attached to the hydraulic cylinder 526 for adjusting the fluid intake of the hydraulic cylinder 526. The microprocessor 530 signals to the regulator valve 531 the proper amount of back pressure for the piston of the hydraulic cylinder 526 for different production runs so that the cylinder sustains the overflow pin 524 in an upwardly biased position that is substantially flush with the lower surface of the mold cavity 289 during perfect conditions, i.e., displacement of the correct amount of charge. In addition to signaling to the charge forming unit the amount of the material to use for the next molding, the microprocessor 530 also signals to the regulator valve 531 the hydraulic pressure needed to properly bias the pin 524 so that the pin retracts when an excess charge is introduced into the mold cavity 289.

Figure 25:
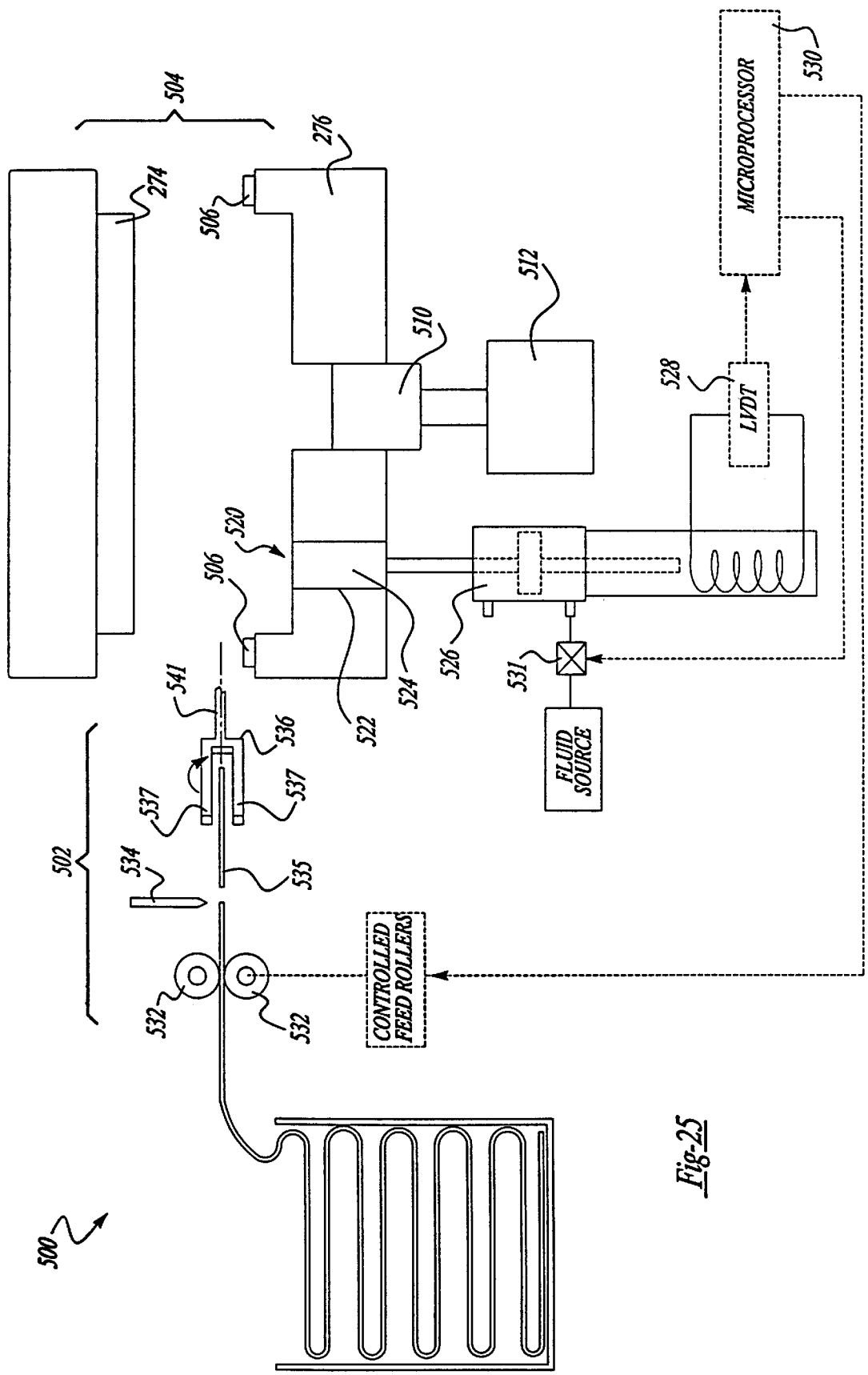
FIG. 25 is a diagrammatic view of a preferred embodiment of a preparation and molding apparatus according to the present invention.

With reference now to FIG. 25, the molding apparatus 500 is shown, including the charge forming unit 502 and the molding unit 504. The charge forming unit 502 comprises controlled feed rollers 532 for advancing the SMC material by a distance controlled by the microprocessor 530, an elongated cutting blade 534 or cutter wheel (not shown) for cutting the SMC sheet material into strips 535, the size of which is controlled by the microprocessor 530, and a wind-up fork 536 for rolling the strips 535 around prongs 537 to form a wrapped charge 538. The wind-up fork 536 is attached to a robotic arm 540, which attaches to a handle 541 of the fork 536 for rotating the wind-up fork 536 to form the wrapped charge 538. The robotic arm 540 further operates to load the wrapped charge 538 into the apertured gateway 508.

Figure 26:
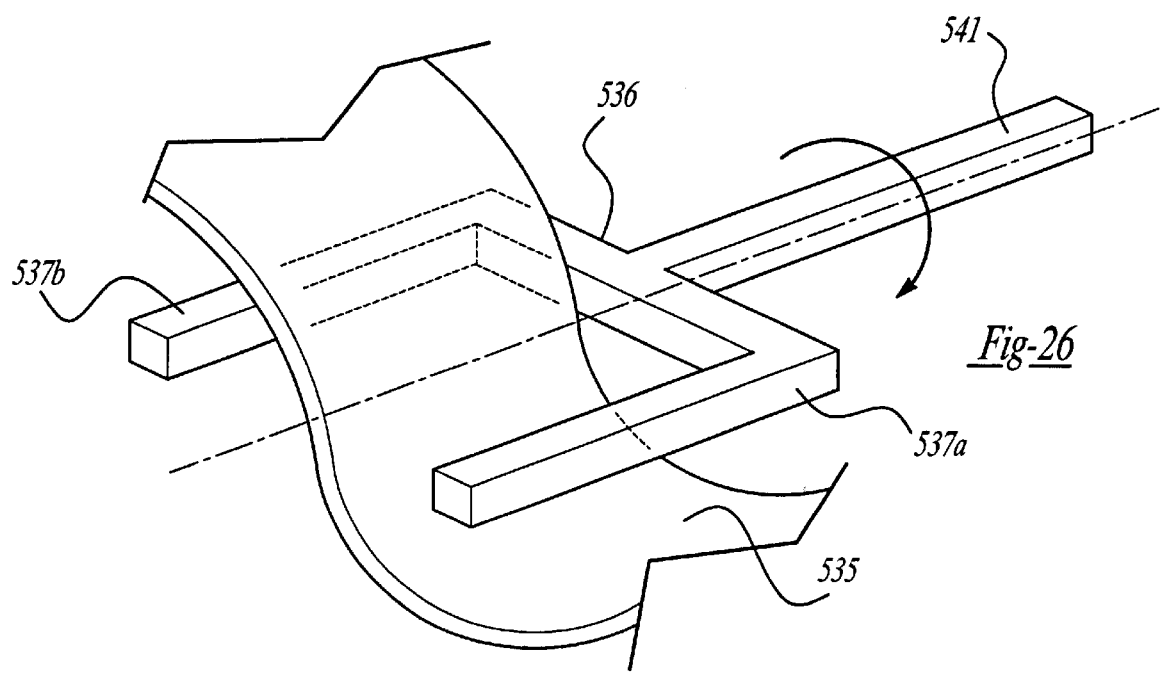
FIG. 26 is perspective view of a wind-up fork of the preparation apparatus of FIG. 25 with the charge positioned between its prongs.
Figure 27:
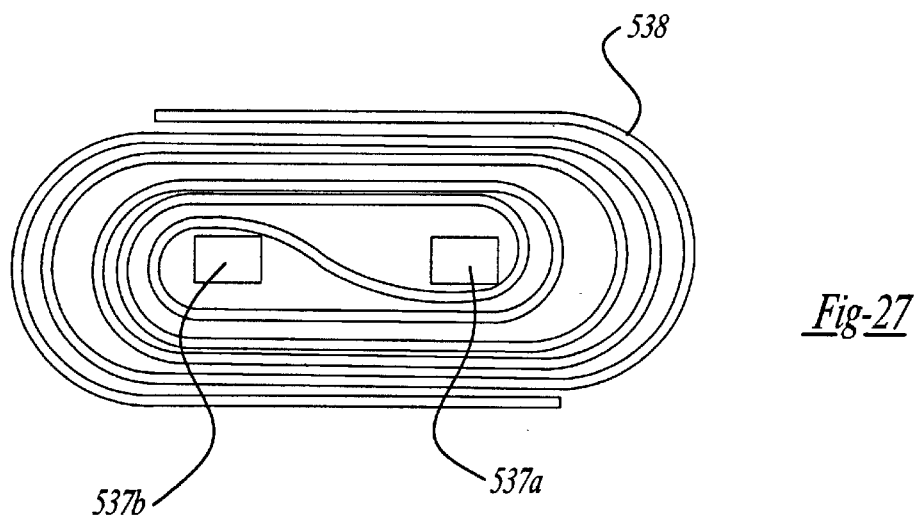
FIG. 27 is a view similar to that of FIG. 26, illustrating the charge rolled on the wind-up fork.
Figure 28:
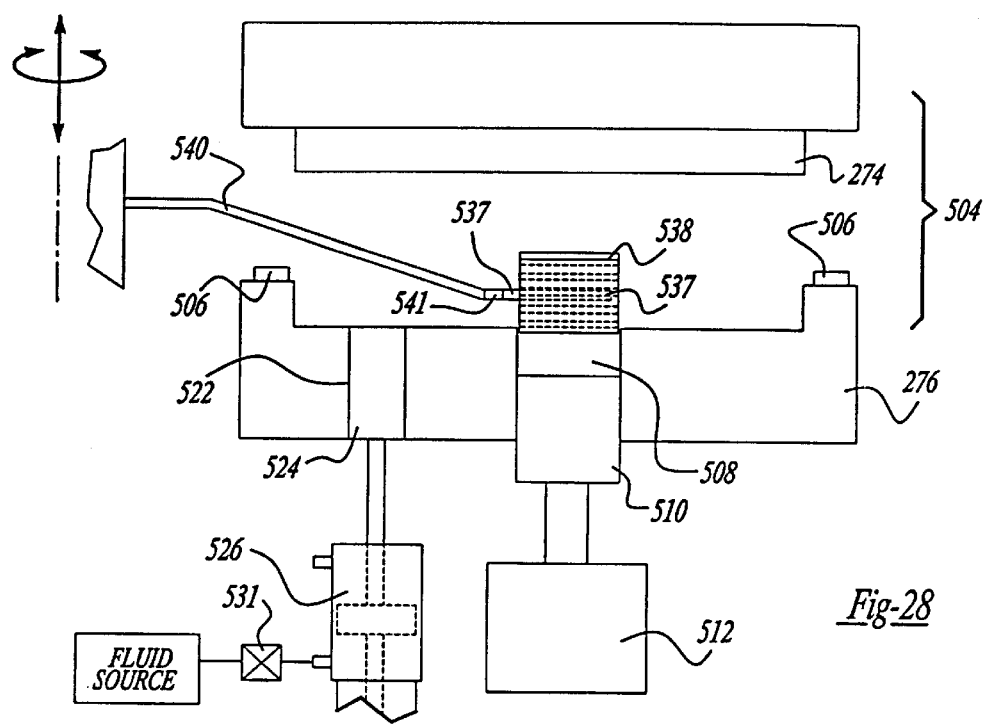
FIG. 28 is a view similar to that of FIG. 24, illustrating the fork of the preparation apparatus robotically loading the charge into the opened molding apparatus with a gate ram retracted to the depth of the charge height.

With particular attention to forming the wrapped charge 538, FIG. 26 illustrates the wind-up fork 536 with the SMC strip 535 positioned between its prongs 537. Further, FIG. 27 illustrates the wind-up fork 536 with the SMC strip 535 rolled around its prongs 537, thereby forming the wrapped charge 538, which (like the stamped stack charge 236) is a relatively large, multi-layered charged having reinforcing fibers that are randomly positioned in each layer substantially parallel to each other and the direction of initial flow into the mold cavity 289. Thus, it can be seen that the rightmost prong 537a and leftmost prong 537b in FIG. 26 contact first and second spaced transverse portions of the strip 535 across substantially the width thereof. The prongs 537a and 537b serve to flip a section of the strip 535 back over on itself due to rotation of handle 541 by robotic arm 540. In such manner, a preferred rolling assembly is provided for forming the oblong shape charge such as shown in FIG. 27. With reference now to FIG. 28, the robotic arm 540 is shown loading the wrapped charge 538 into the apertured gateway 508. It should be appreciated that the robotic arm 540 includes a releasing device (not shown) of any suitable form for properly releasing the wrapped charge 538 into the apertured gateway 508.

Figure 29:
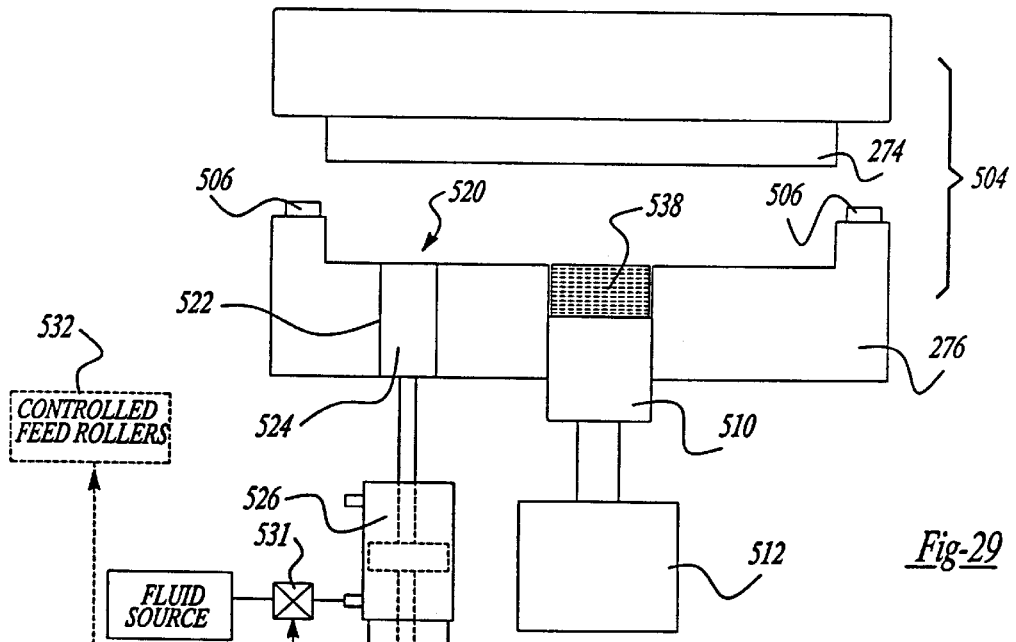
FIG. 29 is a view similar to that of FIG. 24, illustrating the charge loaded into the opened molding apparatus.
Figure 30:
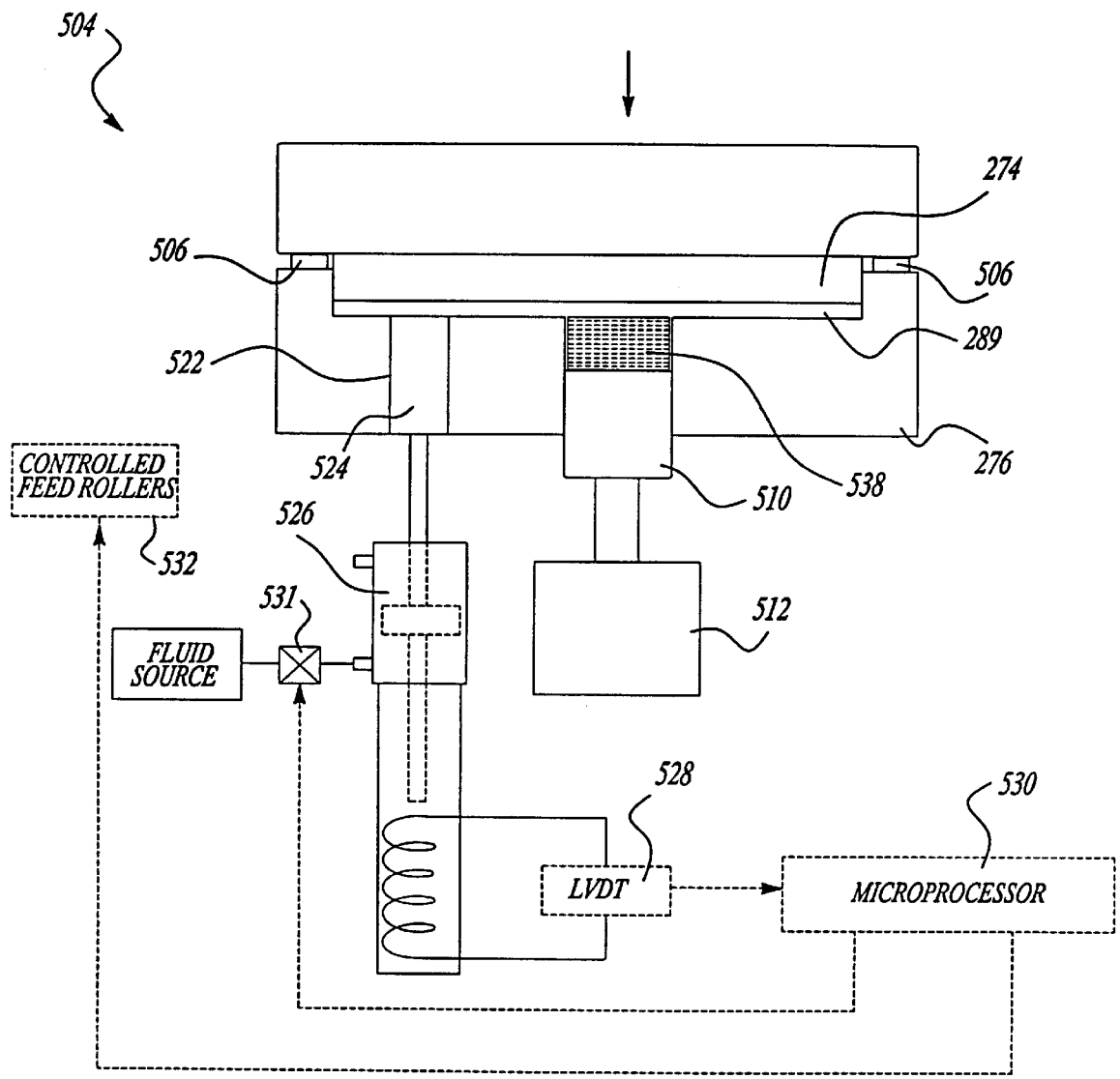
FIG. 30 is a view similar to that of FIG. 29, illustrating the upper die half moved to its closed position with respect to the lower die half.
Figure 31:
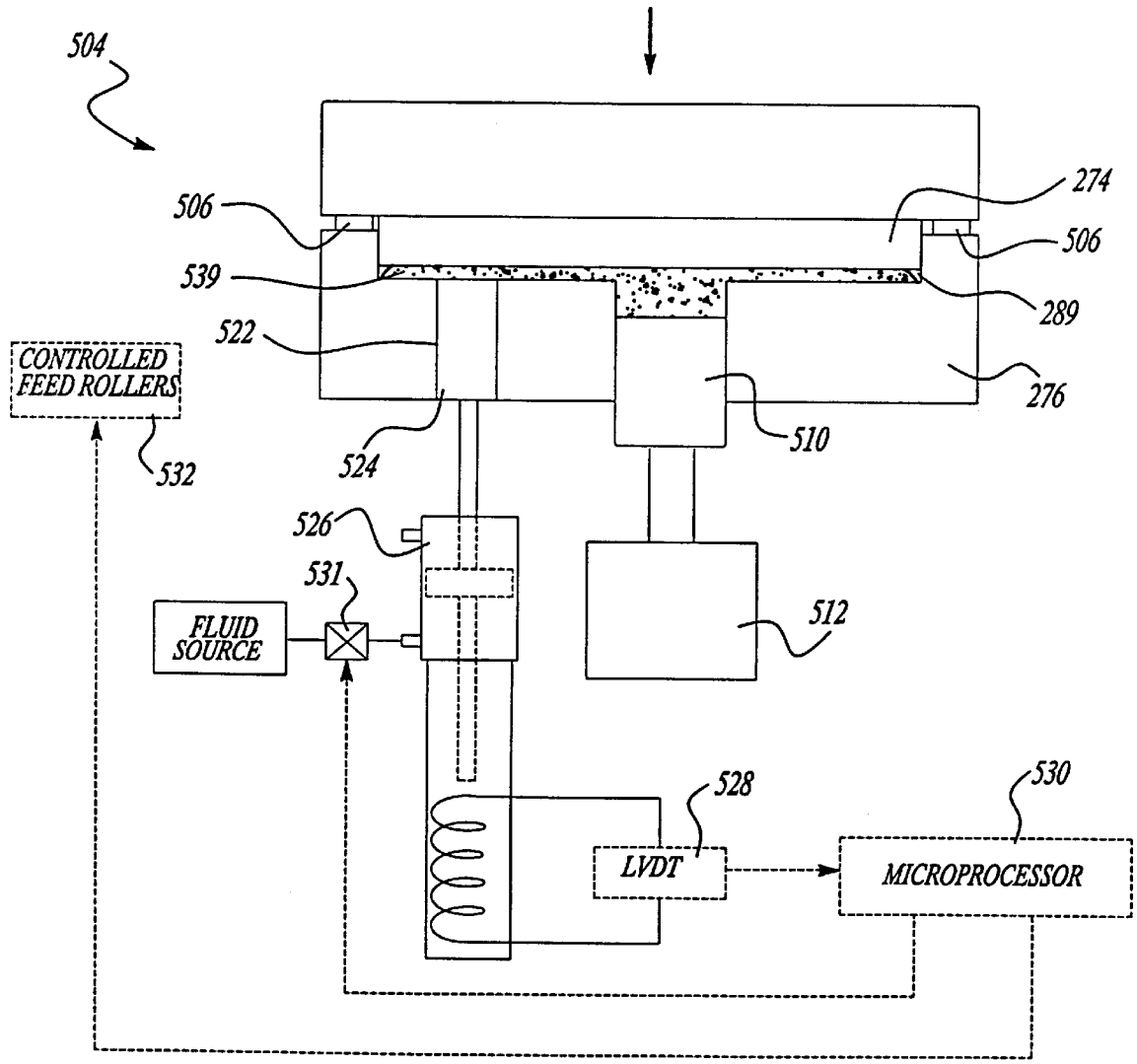
FIG. 31 is a view similar to that of FIG. 30, illustrating the gate ram advanced and the charge pressed into the mold cavity.
Figure 32:
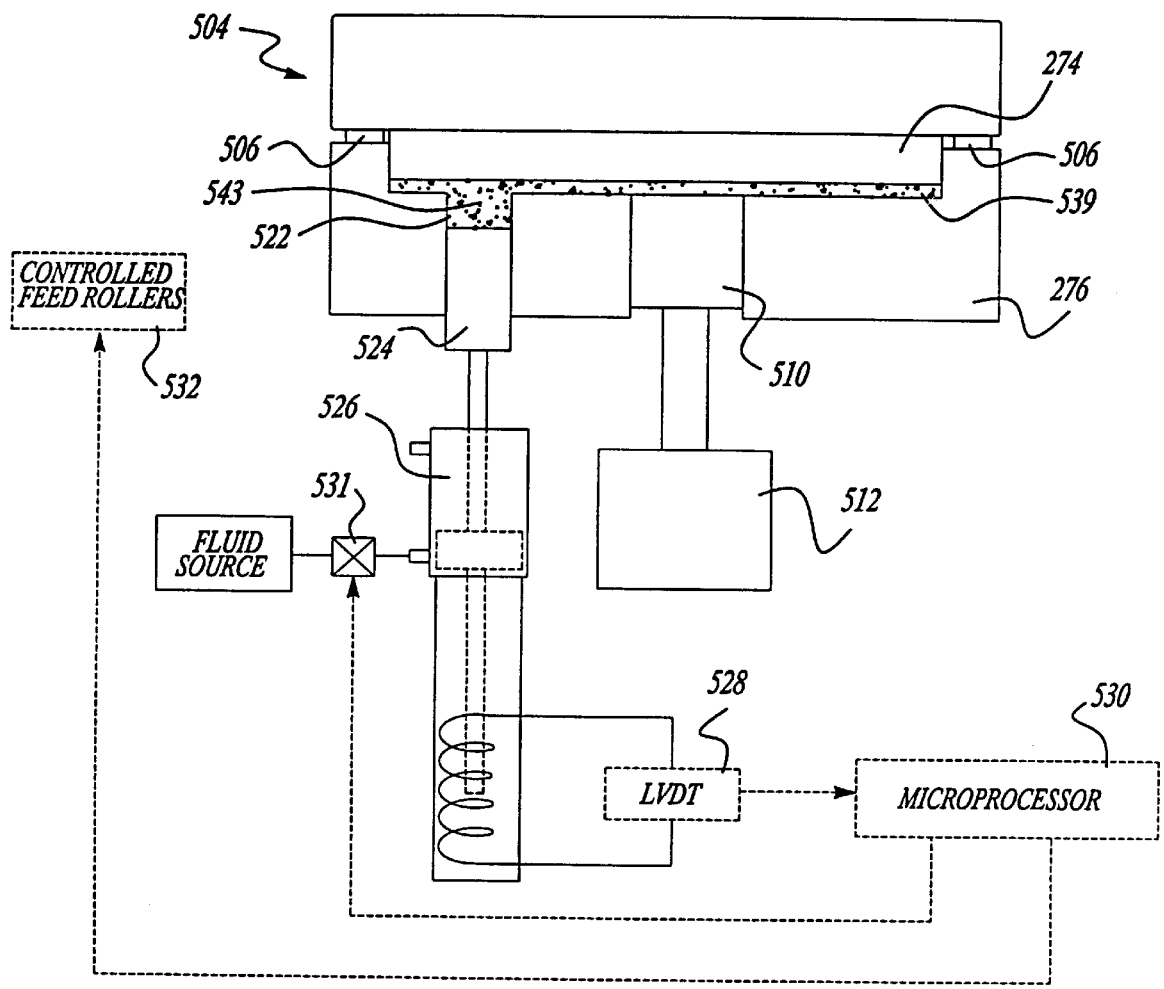
FIG. 32 is a view similar to that of FIG. 31, illustrating the gate ram advanced to a position flush with the lower die half, the charge completely pressed into the mold cavity and an overflow pin, according to the present invention, displaced by excess charge from the mold cavity.

FIGS. 29 through 32 illustrate the progression of the wrapped charge 538 from the apertured gateway 508 into the mold cavity 289. Specifically, as illustrated in FIG. 29, the molding unit 504 is shown in its opened position with the wrapped charge 538 positioned on top of the gate ram 510, which is retracted so that charge height fits within the apertured gateway 508, and the overflow pin 524 is flush with the lower surface of the mold cavity 289. FIG. 30 illustrates the next step of the process, wherein the molding unit 504 is shown in its closed position with the upper die 274 lowered onto stops 506, thereby forming the mold cavity 289. Further, in FIG. 31, the gate ram 510 is advanced and the once wrapped charge 538 is now a displaced charge 539, which nearly fills the mold cavity 289. As such, the overflow pin 524 remains substantially flush with the lower surface of the mold cavity 289, wherein the displacement sensing transducer 528 senses no displacement of the overflow pin 524. The final step is illustrated in FIG. 32, wherein the gate ram 510 is fully advanced and flushed with the lower surface of the mold cavity 289 and the displaced charge 539 is completely displaced within the mold cavity 289. Complete displacement of the charge material into the mold cavity 289 uniformly fills the mold cavity 289 to its capacity. If charge exceeding the capacity of the mold cavity 289 is displaced therein by the gate ram 510, the overflow pin 524 is displaced to a depth below the lower surface of the mold cavity 289. The displacement sensing transducer 528 (for example, a linearly variable displacement transducer (LVDT)) then senses and measures the displacement of the overflow pin 524 by the excess charge and communicates the measurement data to the microprocessor 530, which performs its calculations and then sends signals to the feed rollers 532, so that the amount of SMC material used on the subsequent molding may be adjusted to its minimum required quantity.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for forming a fiber reinforced component, the apparatus comprising:
   an advancing assembly for advancing a sheet of fiber reinforced plastic;
   a cutting assembly for cutting a strip from said sheet of fiber reinforced plastic;
   means for rolling said strip to form an oblong-shaped wrapped charge having a plurality of stacked layers in which fibers therein are essentially oriented parallel to each other;
   a molding assembly having upper and lower die surfaces forming a mold cavity therebetween; and
   a loading assembly for loading said wrapped charge into said molding assembly such that the fibers in the charge are essentially parallel to the upper and lower die surfaces, wherein said fiber reinforced component is formed In said mold cavity.

2. The apparatus of claim 1 wherein said advancing assembly includes traction rollers.

3. The apparatus of claim 1 wherein said rolling assembly includes a handle and oppositely extending prongs around which said strip is wound.

4. The apparatus of claim 3 wherein said loading assembly includes a robotic arm attached to said handle for automatically loading said wrapped charge into said molding assembly directly from said prongs.

5. The apparatus of claim 1 further comprising an overflow assembly for receiving excess charge displaced from said mold cavity.

6. The apparatus of claim 5 further comprising a displacement assembly for sensing and measuring said excess charge displaced within said overflow assembly.

7. An apparatus for forming a fiber reinforced component, the apparatus comprising:
   a rolling assembly for rolling a strip of fiber reinforced plastic to form an oblong-shaped wrapped charge having a plurality of stacked layers in which fibers therein are essentially oriented parallel to each other, said rolling assembly including a device for contacting at least a first transverse portion of the strip and a mechanism for flipping a section of the strip back over on itself into said oblong-shaped wrapped charge;
   a molding assembly having upper and lower die surfaces forming a mold cavity therebetween; and
   wherein said wrapped charge is loaded into said molding assembly such that the fibers in the charge are essentially parallel to the upper and lower die surfaces wherein said fiber reinforced component is formed in said mold cavity.

8. The apparatus of claim 7 wherein said rolling assembly includes a handle and oppositely extending prongs around which said strip is wound.

9. The apparatus of claim 7 wherein said loading assembly includes a robotic arm attached to said handle for automatically loading said wrapped charge into said lower die directly from said prongs.

10. The apparatus of claim 7 further comprising a cutting assembly for cutting said strip of plastic from a sheet of fiber reinforced plastic.

11. The apparatus of claim 10 further comprising an advancing assembly for feeding said sheet of plastic to said cutting assembly.

12. The apparatus of claim 11 wherein said advancing assembly includes traction rollers.

13. The apparatus of claim 7 further including an overflow assembly for receiving excess charge displaced from said mold cavity.

14. The apparatus of claim, 13 further including a displacement assembly for sensing and measuring said excess charge displaced within said overflow assembly.

15. The apparatus of claim 7 wherein the fiber reinforced material comprises a thermosetting resin.

16. The apparatus of claim 15 wherein the fiber reinforced material is sheet molding compound.

17. The apparatus of claim 7 wherein the die surfaces are heated.

18. The apparatus of claim 7 further comprising a means for moving the upper and lower die surfaces together to form the mold cavity.

19. The apparatus of claim 7 further comprising a loading assembly for automatically loading the wrapped charge into the molding assembly.

* * * * *